United States Patent
Sakamoto et al.

(10) Patent No.: US 9,593,212 B2
(45) Date of Patent: Mar. 14, 2017

(54) METHOD FOR PRODUCING WATER ABSORBENT RESIN PARTICLE

(75) Inventors: Shigeru Sakamoto, Himeji (JP); Yoshio Irie, Himeji (JP); Hiroyuki Ikeuchi, Himeji (JP); Makoto Nagasawa, Himeji (JP); Kunihiko Ishizaki, Suita (JP); Sayaka Machida, Kobe (JP)

(73) Assignee: Nippon Shokubai Co., Ltd., Osaka (JP)

(*) Notice: Subject to any disclaimer, the term of this patent is extended or adjusted under 35 U.S.C. 154(b) by 338 days.

(21) Appl. No.: 12/296,808

(22) PCT Filed: Sep. 28, 2007

(86) PCT No.: PCT/JP2007/069516
§ 371 (c)(1),
(2), (4) Date: Oct. 10, 2008

(87) PCT Pub. No.: WO2008/038840
PCT Pub. Date: Apr. 3, 2008

(65) Prior Publication Data
US 2009/0305884 A1    Dec. 10, 2009

(30) Foreign Application Priority Data

Sep. 29, 2006 (JP) ................................. 2006-267567

(51) Int. Cl.
C08J 3/12 (2006.01)
B29B 17/00 (2006.01)

(52) U.S. Cl.
CPC .................. *C08J 3/12* (2013.01); *B29B 17/00* (2013.01); *C08J 2300/14* (2013.01); *Y02W 30/62* (2015.05)

(58) Field of Classification Search
CPC ...... B01J 20/32; B01J 20/26; B01J 20/28026; B01J 20/2803; A61L 15/60
(Continued)

(56) References Cited

U.S. PATENT DOCUMENTS

| | | |
|---|---|---|
| 4,734,478 A | 3/1988 | Tsubakimoto et al. |
| RE32,649 E | 4/1988 | Brandt et al. |

(Continued)

FOREIGN PATENT DOCUMENTS

| | | | |
|---|---|---|---|
| EP | 417761 | * | 12/1990 |
| EP | 0417761 | * | 12/1990 |

(Continued)

OTHER PUBLICATIONS

Supplemental European Search Report issued in Application No. 07829254.7-2109 dated Sep. 1, 2010, 7 pages.

*Primary Examiner* — Melissa Swain
(74) *Attorney, Agent, or Firm* — Cesari and McKenna LLP

(57) ABSTRACT

The present invention provides a method for producing a water absorbent resin particle, in high productivity, not only in a controlled manner of particle size but also enhancing fundamental property (absorption capacity or absorption capacity against pressure) of a water absorbent resin. A method for producing a water absorbent resin particle having the cross-linking polymerization step for an aqueous solution of an unsaturated monomer; the grain refining step for water-swellable, water-containing gel-like cross-linked polymer (a) obtained in the cross-linking polymerization step; the drying step for grain refined gel; and the crushing step for a dried substance, wherein, in the grain refining step for the water-swellable, water-containing gel-like cross-linked polymer (a), water-swellable, water-containing gel-like cross-linked polymer (b), having solid content or centrifuge retention capacity different from solid content or
(Continued)

centrifuge retention capacity of the cross-linked polymer (a) by equal to or larger than 1%, is subjected to coexistence.

11 Claims, 3 Drawing Sheets

(58) Field of Classification Search
USPC .................................... 521/40.5, 45, 45.5
See application file for complete search history.

(56) References Cited

U.S. PATENT DOCUMENTS

| | | | |
|---|---|---|---|
| 4,950,692 A * | 8/1990 | Lewis et al. | 521/45 |
| 4,970,267 A | 11/1990 | Bailey et al. | |
| 5,051,259 A | 9/1991 | Olsen et al. | |
| 5,064,582 A | 11/1991 | Sutton et al. | |
| 5,350,799 A | 9/1994 | Woodrum et al. | |
| 5,369,148 A | 11/1994 | Takahashi et al. | |
| 5,419,956 A | 5/1995 | Roe | |
| 5,432,899 A | 7/1995 | Iwatani et al. | |
| 5,453,323 A | 9/1995 | Chambers et al. | |
| 5,455,284 A | 10/1995 | Dahmen et al. | |
| 5,462,972 A * | 10/1995 | Smith et al. | 521/53 |
| 5,478,879 A | 12/1995 | Kajikawa et al. | |
| 5,797,893 A | 8/1998 | Wada et al. | |
| 6,087,002 A | 7/2000 | Kimura et al. | |
| 6,127,454 A | 10/2000 | Wada et al. | |
| RE37,021 E | 1/2001 | Aida | |
| 6,184,433 B1 | 2/2001 | Harada et al. | |
| 6,228,930 B1 | 5/2001 | Dairoku et al. | |
| 6,297,335 B1 | 10/2001 | Funk et al. | |
| 6,867,269 B2 | 3/2005 | Sakamoto et al. | |
| 6,906,159 B2 | 6/2005 | Dairoku et al. | |
| 6,921,819 B2 * | 7/2005 | Piron et al. | 536/55.3 |
| 7,429,009 B2 * | 9/2008 | Nagasawa | C08J 3/12 241/21 |
| 2004/0092688 A1 | 5/2004 | Dairoku et al. | |
| 2004/0234607 A1 | 11/2004 | Irie et al. | |

FOREIGN PATENT DOCUMENTS

| | | | |
|---|---|---|---|
| EP | 0417761 * | 3/1991 | B29B 17/00 |
| EP | 0417761 A2 * | 3/1991 | |
| EP | 0 455 846 | 11/1991 | |
| EP | 0629441 | 12/1994 | |
| EP | 0712659 | 5/1996 | |
| EP | 0707603 | 9/1997 | |
| EP | 1029886 | 8/2000 | |
| EP | 1 690 887 | 8/2006 | |
| GB | 2267094 B | 11/1993 | |
| JP | 3152104 | 6/1991 | |
| JP | A-3-152104 | 6/1991 | |
| JP | 441532 | 2/1992 | |
| JP | A-4-41532 | 2/1992 | |
| JP | 4227934 | 8/1992 | |
| JP | A-4-227934 | 8/1992 | |
| JP | 543610 | 2/1993 | |
| JP | A-5-43610 | 2/1993 | |
| JP | 20007790 | 1/2000 | |
| JP | 200007790 * | 1/2000 | |
| JP | A-2000-7790 | 1/2000 | |
| JP | 2000007790 * | 11/2000 | |
| JP | 200179829 | 3/2001 | |
| JP | A-2001-79829 | 3/2001 | |
| JP | 200007790 * | 11/2001 | |
| JP | 200467878 | 3/2004 | |
| JP | A-2004-67878 | 3/2004 | |
| WO | WO95/02002 | 1/1995 | |

* cited by examiner

METHOD FOR PRODUCING WATER ABSORBENT RESIN PARTICLE

CROSS-REFERENCE TO RELATED APPLICATIONS

This application is the Nation Stage of International Application No. PCT/JP2007/069516, filed on Sep. 28, 2007, which claims the priority of Japanese Application No. 2006-267567, filed on Sep. 29, 2006. The contents of both applications are hereby incorporated by reference in their entirety.

TECHNICAL FIELD

The present invention relates to a method for producing a water absorbent resin, which is a water-swellable cross-linked polymer, and more specifically the present invention relates to a method for producing a water absorbent resin having a controlled particle size, and excellent in fundamental property such as absorption capacity or extractables.

BACKGROUND ART

At present, a water absorbent resin (a water absorbing agent) such as a cross-linked polymer of a polyacrylate salt is widely used, aiming at absorbing body fluid, as a constitution material of a hygienic article such as a disposable diaper or a sanitary napkin, so-called an incontinence pad or the like.

Such a water absorbent resin is required to have excellent property such as excellent fluid absorption amount or water absorption rate, gel strength, gel fluid permeability in contacting with aqueous fluid such as body fluid or the like, or excellent water suction force from a substrate containing aqueous fluid. Furthermore, in recent essential requirements include a water absorbent resin powder having very narrow particle size distribution, or a water absorbent resin powder having high absorption capacity or low extractables, and also high absorption capacity against pressure or fluid permeability against pressure.

U.S. Pat. Re No. 32649 has proposed a water absorbent resin excellent in gel strength, extractables and water absorption capacity; GBP No. 2267094B has proposed a water absorbent resin excellent in fluid permeability without load, water absorption rate and absorption capacity; technology specifying specific particle size distribution has been proposed in U.S. Pat. Nos. 5,051,259, 5,419,956, 6,087,002, EP No. 0629441 or the like. In addition, there are many proposals on water absorbent resins excellent in absorption capacity against pressure under various loads, or a measurement method therefor, and water absorbent resins with excellent absorption capacity against pressure only or other properties in combination have been proposed in EP No. 0707603, EP No. 0712659, EP No. 1029886, U.S. Pat. Nos. 5,462,972, 5,453,323, 5,797,893, 6,127,454, 6,184,433, 6,297,335 and U.S. Pat. Re No. 37021 or the like.

Among these properties, particle size has strong effect on other properties of a water absorbent resin, therefore, many methods for controlling particle size have been proposed. For example, as a method for controlling particle size, a method for recovering only a fine powder by separation, agglomeration or gelling has been proposed in U.S. Pat. Nos. 6,228,930, 4,950,692 (issued on Aug. 21, 1990), U.S. Pat. No. 4,970,267 (issued on Nov. 13, 1990), U.S. Pat. No. 5,064,582 (issued on Nov. 12, 1991) or the like; a method for polymerization of a powder of a water absorbent resin as a monomer has been proposed in U.S. Pat. Nos. 5,432,899, 5,455,284, 6,867,269 or the like; and a method for agglomeration of all of water absorbent resins has been proposed in U.S. Pat. Nos. 4,734,478 and 5,369,148 or the like.

In addition, also a method for a polymerization or gel crushing to maintain high productivity and property has been proposed in U.S. Pat. No. 6,906,159, US-2004-092688A, US-2004-234607A or the like.

However, trying to enhance property (for example, particle size control, enhancement of absorption capacity, reduction of water-extractables) of a water absorbent resin by technique proposed in U.S. Pat. Re No. 32649, GBP No. 2267094B, U.S. Pat. Nos. 5,051,259, 5,419,956, 6,087,002, EP No. 0629441, EP No. 0707603, EP No. 0712659, EP No. 1029886, U.S. Pat. Nos. 5,462,972, 5,453,323, 5,797,893, 6,127,454, 6,184,433, 6,297,335 and U.S. Pat. Re No. 37021, accompanies, in many cases, reduction of productivity or use of sub-raw materials, and thus increase in production cost of a water absorbent resin is not desirable, in the viewpoint that a water absorbent resin is a disposable raw material of a diaper or the like.

Methods for controlling particle size proposed in U.S. Pat. Nos. 6,228,930, 4,950,692, 4,970,267, 5,064,582, 5,432,899, 5,455,284, 6,867,269, 4,734,478 and 5,369,148 provide still insufficient control of particle size, and further addition of the new particle size controlling step (agglomeration or fine powder recovery) not only accompanied cost increase, but also provided lowering of properties other than particle size, depending on cases. In addition, also in U.S. Pat. No. 6,906,159, US-2004-092688A and US-2004-234607A, there was room for improvement.

DISCLOSURE OF THE INVENTION

Namely, the present invention has been made in view of the above circumstance. The present invention provides a method for producing a water absorbent resin particle, in high productivity, not only in controlling particle size but also enhancing fundamental property (for example, absorption capacity without load, absorption capacity against pressure, extractables) of a water absorbent resin.

To solve the above problems, a production method of the present invention is a method for producing a water absorbent resin particle having the cross-linking polymerization step of an aqueous solution of a water-soluble unsaturated monomer; the grain refining step for water-swellable, water-containing gel-like cross-linked polymer (a) obtained in the cross-linking polymerization step; the drying step for grain refined gel; and the pulverizing and classifying step for a dried substance, wherein, in the grain refining step for the water-swellable, water-containing gel-like cross-linked polymer (a), water-swellable, water-containing gel-like cross-linked polymer (b), having solid content or centrifuge retention capacity different from solid content or centrifuge retention capacity of the cross-linked polymer (a), is subjected to coexistence.

According to the present invention, control of particle size (for example, reduction of a fine powder) of a water absorbent resin is attained in low cost and in high productivity. In addition, it is also possible to enhance fundamental property (for example, absorption capacity without load, absorption capacity against pressure, extractables) of a water absorbent resin.

Further other objectives, features and advantages of the present invention will be clear by referring to preferable embodiments exemplified in the following explanation.

DETAILED DESCRIPTION OF THE EMBODIMENT

Figure 1:
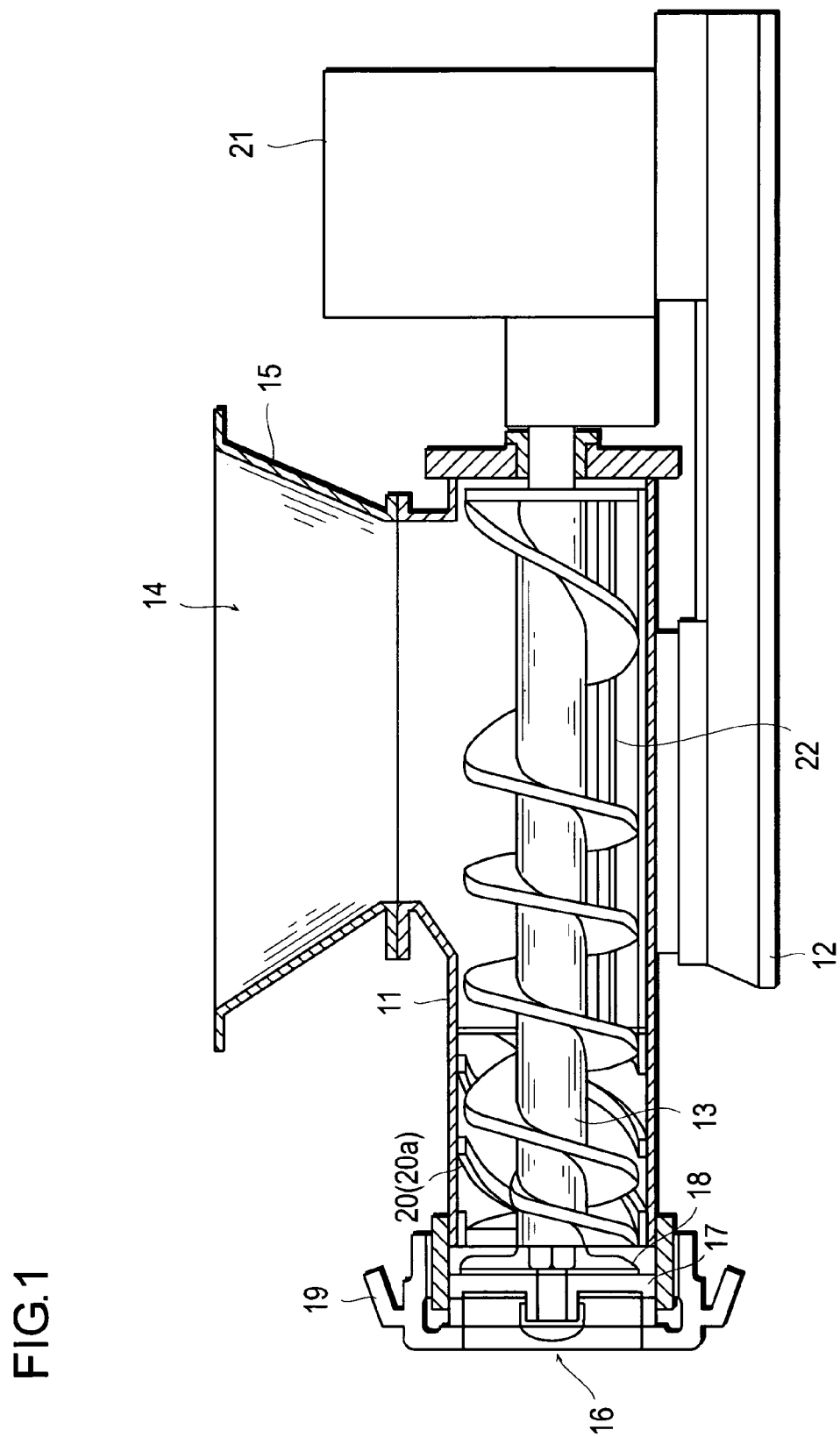
FIG. 1 is a conceptual drawing of a gel grain refining apparatus (a meat chopper), which can be used in the present invention.

Detailed explanation will be given below on the present invention, however, technical scope of the present invention should be determined based on description of claims, and should not be limited by the following specific embodiments.

<<The Cross-Linking Polymerization Step>>

(a) An Unsaturated Monomer

In the present invention, as an unsaturated monomer of a water absorbent resin, acrylic acid and/or a salt thereof are preferably used, and content thereof is preferably from 50 to 100% by mol, and more preferably from 70 to 100% by mol and further preferably from 90 to 100% by mol, relative to total amount of the unsaturated monomer. The above-mentioned water absorbent resin is hereinafter called as polyacrylic acid (salts)-based water absorbent resin or polyacrylic acid (salts)-based cross-linked polymer.

As the acrylate salt, a monovalent salt such as an alkali metal salt, an ammonium salt or an amine salt or the like is included. As neutralization rate, in the case where acrylic acid is neutralized with the above salt, it is preferably from 30% by mol to 100% by mol, further preferably from 50% by mol to 90% by mol, and particularly more preferably from 60% by mol to 80% by mol. It should be noted that, the neutralization of acrylic acid may be carried out in advance at the stage of preparation of the unsaturated monomer before obtaining a water-containing polymer, and subsequently initiate a polymerization reaction; or polyacrylic acid of the above cross-linked polymer obtained during polymerization or after completion of the polymerization reaction may be neutralized; or they may be combined.

As a monomer other than acrylic acid used in the present invention includes, for example, a monomer exemplified in U.S. patents or European patents to be described later, and also includes specifically, for example, a water-soluble or hydrophobic unsaturated monomer such as methacrylic acid, maleic acid (anhydride), fumaric acid, crotonic acid, itaconic acid, vinylsulfonic acid, 2-(meth)acrylamide-2-methylpropane sulfonic acid, (meth)acryloxyalkane sulfonic acid and an alkaline metal salt and an ammonium salt thereof; N-vinyl-2-pyrrolidone, N-vinylacetamide, (meth) acrylamide, N-isopropyl(meth)acrylamide, N,N-dimethyl (meth)acrylamide, 2-hydroxyethyl(meth)acrylate, methoxy-polyethylene glycol (meth)acrylate, polyethylene glycol (meth)acrylate, isobutylene, lauryl(meth)acrylate or the like.

(b) An Inner Cross-Linking Agent

A method for cross-linking used in the present invention is not especially limited, and includes for example, a post-cross-linking method by the addition of a cross-linking agent during polymerization or after the polymerization; a radical cross-linking method using a radical polymerization initiator; a radiation cross-linking method using electron beams or the like; or the like. It is preferable to polymerize by the addition of a predetermined amount of an inner cross-linking agent, in advance, to a monomer, and then subjecting to a cross-linking reaction at the same time of polymerization or after polymerization.

As the inner cross-linking agent used in the present invention, one kind or two or more kinds of a polymerizable inner cross-linking agent such as N,N'-methylenebisacrylamide, (poly)ethylene glycol di(meth)acrylate, (poly)propylene glycol di(meth)acrylate, (polyoxyethylene)trimethylolpropane tri(meth)acrylate, trimethylolpropane di(meth) acrylate, polyethylene glycol di(β-acryloyloxypropionate), trimethylolpropane tri(β-acryloyloxypropionate), poly(meth)allyloxyalkane or the like; or a reactive inner cross-linking agent with a carboxyl group, such as polyglycidyl ether(ethylene glycol diglycidyl ether, or the like), polyol (ethylene glycol, polyethylene glycol, glycerin, sorbitol, or the like) are used. It should be noted that, in the case where one or more kinds of inner cross-linking agents are used, it is preferable to essentially use the polymerizable inner cross-linking agent, in consideration of absorption characteristics or the like of the resulting water absorbent resin.

In view of property aspect, the inner cross-linking agent is used in a range of from 0 to 3% by mol, preferably from 0.005 to 2% by mol, more preferably from 0.01 to 1% by mol, and further preferably from 0.05 to 0.2% by mol, relative to the above monomer.

(c) An Aqueous Solution

In the present invention, cross-linking polymerization is carried out by using an aqueous solution of an unsaturated monomer. In the case where reversed phase suspension polymerization or aqueous solution polymerization is carried out in the polymerization step, an aqueous solution containing the inner cross-linking agent is used, if necessary. Concentration of the unsaturated monomer component in this aqueous solution (hereafter referred to as a monomer aqueous solution) is, in view of property aspect, preferably from 10 to 70% by weight, more preferably from 15 to 65% by weight, and further preferably from 30 to 55% by weight. It should be noted that a solvent other than water may be used in combination, if necessary, and kind of the solvent used in combination is not especially limited, however, alcohols such as methyl alcohol, ethyl alcohol, n-propyl alcohol, isopropyl alcohol, n-butyl alcohol, isobutyl alcohol, t-butyl alcohol, and the like are exemplified. The solvent used in combination is used, for example, in a range of from 0 to 50% by weight relative to the water.

Furthermore, various properties of a water absorbent resin may be improved by the addition of a water-soluble resin and/or a water absorbent resin (particulate (spherical, amorphous, or crushed form) water absorbent resin or water absorbent resin of fine particles in an amount of, for example, from 0 to 50% by weight, preferably from 0 to 20% by weight; or at least one kind selected from various foaming agents (a carbonate salt, an azo compound, air bubbles or the like), a surfactant, a chelating agent, and a chain transfer agent such as hypophosphorous acid (or a salt) or the like, in an amount of from 0 to 5% by weight, preferably from 0 to 1% by weight, relative to the monomer, in polymerization.

(d) The Polymerization Step

In polymerization of the above aqueous solution of the unsaturated monomer, it is preferably carried out by aqueous solution polymerization or reversed phase polymerization in view of performance aspect or easiness of polymerization control. These polymerizations may be carried out under air atmosphere, however, it is preferable to be carried out under inert gas atmosphere such as nitrogen or argon (for example, under an oxygen concentration of equal to or lower than 1%), and a monomer component is preferably used for polymerization after sufficient purging of dissolved oxygen with inert gas (for example, under an oxygen concentration of below 1 ppm). In the present invention, continuous belt polymerization, and continuous or batch kneader polymerization are included as particularly preferable aqueous solution polymerization, which is particularly suitable to aqueous solution polymerization, which was difficult to control polymerization, to obtain a water absorbent resin with excellent property in high productivity.

Aqueous solution polymerization is a method for polymerization of a monomer aqueous solution without using a dispersion solvent, and is described in, for example, U.S. patents such as U.S. Pat. Nos. 4,625,001, 4,873,299, 4,286,082, 4,973,632, 4,985,518, 5,124,416, 5,250,640, 5,264,495, 5,145,906, 5,380,808 or the like; and European patens such as EP No. 0811636, EP No. 0955086, EP No. 0922717, EP No. 1178059, EP No. 1711541, EP No. 1799721 or the like. A monomer, a cross-linking agent, a polymerization initiator and other additives described in these patents are also applicable to the present invention.

Among the above polymerization methods, high temperature polymerization is preferable, wherein polymerization initiation temperature of the aqueous solution of the unsaturated monomer is equal to or higher than 40° C., further preferably equal to or higher than 50° C., still further preferably equal to or higher than 60° C., and particularly preferably equal to or higher than 70° C. Application of the present invention to water-containing gel obtained by such high temperature polymerization (high temperature initiation polymerization) is capable of fulfilling effect of the present invention including particle size control to the maximum extent possible. It should be noted that the upper limit is equal to or lower than boiling point of the aqueous solution, preferably equal to or lower than 105° C.

In addition, high temperature polymerization (boiling polymerization) is preferable, wherein peak temperature of polymerization temperature is equal to or lower than 95° C., more preferably equal to or lower than 100° C. and further preferably equal to or lower than 105° C. (boiling point polymerization). Application of the present invention to water-containing gel obtained by such boiling temperature polymerization is capable of fulfilling effect of the present invention including particle size control to the maximum extent possible. It should be noted that the upper limit is sufficient to be equal to or lower than boiling point, preferably equal to or lower than 130° C., and further preferably equal to or lower than 120° C. is sufficient.

It should be noted that polymerization time is also not especially limited, and may be determined as appropriate, depending on kind of a hydrophilic monomer or a polymerization initiator, reaction temperature or the like, however, usually from 0.5 minute to 3 hours, and preferably from 1 minute to 1 hour.

In polymerization of a monomer aqueous solution, for example, a redox-type initiator, wherein a polymerization initiator such as a persulfate salt such as potassium persulfate, ammonium persulfate, sodium persulfate; hydroperoxide such as t-butylhydroperoxide, hydrogen peroxide; azo compound such as 2,2'-azobis(2-amidinopropane dihydrochlorate salt; 2-hydroxy-1-phenyl-propane-1-one, benzoin methyl ether, or the like; and further a reducing agent such as L-ascorbic acid, which promotes decomposition of these polymerization initiators, are used in combination. Using amount of the polymerization initiator is usually in a range of from 0.001 to 1% by mol, further preferably from 0.001 to 0.5% by mol, relative to the monomer.

In addition, instead of using a polymerization initiator, a polymerization reaction may be carried out by irradiation of activated energy beams such as radiation beams, electron beams, ultraviolet rays and the like to a reaction system; or by combination with radiation beams, electron beams, an ultraviolet ray-sensitive polymerization initiator and the like; or by combination with the above polymerization initiators.

Rate of polymerization of the resulting water-containing gel-like cross-linked polymer (hereafter, water-containing gel) is preferably not less than 70% by mol, more preferably not less than 90% by mol and further preferably not less than 95% by mol. Most preferably, the rate of polymerization is further increased (preferably not less than 99% by mol, and further preferably not less than 99.9% by mol) by subsequent drying step or the like.

<<The Grain Refining Step>>

The present invention is characterized in that, in the grain refining step for the water-swellable, water-containing gel-like cross-linked polymer (a) (hereafter may be referred to also as water-containing gel (a)), the water-swellable, water-containing gel-like cross-linked polymer (b), having solid content or centrifuge retention capacity different from solid content or centrifuge retention capacity of the cross-linked polymer (a), is subjected to coexistence. Preferably, both the cross-linked polymer (a) and the cross-linked polymer (b) are the polyacrylic acid (salts)-based cross-linked polymer.

"The grain refining step" means a step of crushing gel.

Coexistence here indicates a state that the water-containing gel (a) and the water-containing gel (b) are present together in a grain refining apparatus, and suitably, the water-containing gel (a) and the water-containing gel (b) are present together in a grain refining apparatus during the grain refining step. For example, an embodiment that the water-containing gel (a) and the water-containing gel (b) are started to be charged into the grain refining apparatus at the same time, and end the charging at the same time; and an embodiment that the water-containing gel (a) and the water-containing gel (b) are mixed before charging into the grain refining apparatus, and then charged into the grain refining apparatus; are included. The mixture of the water-containing gel (a) and the water-containing gel (b) may be carried out continuously, semicontinuously or in batch-wise.

The explanation will be given in detail below on materials and apparatuses used in the grain refining step.

(The Water-Swellable, Water-Containing Gel-Like Cross-Linked Polymer (a))

In the present invention, the water-swellable, water-containing gel-like cross-linked polymer (a) obtained by the cross-linking polymerization step is subjected to grain refining before drying. Particle diameter (specified by a standard sieve) of the water-containing gel (a) after the grain refining is, in view of particle size control or property aspect, as mass median particle size, preferably from 0.1 to 20 mm, more preferably from 0.5 to 10 mm and further preferably from 1 to 5 mm. Preferably, not less than 95% by weight of the water-containing gel (a) has a particle size of not more than 25 mm. It should be noted that the classification of the gel may be carried out in wet process with solvent, or in dry process without solvent.

A shape of the water-containing gel (a) before the grain refining may take various forms such as particulate, belt-like, plate-like, film-like, block-like one or the like, depending on a polymerization method. In the present invention, the water-containing gel (a) in any form can be subjected to grain refining, however, it is preferably a belt-like substance obtained by belt-polymerization or the like. It is because supplying belt-like gel to a gel grain refining apparatus (in particular, a screw extruder to be described later) provides entanglement of the belt-like gel to a rotating blade, and is capable of grain refining efficiently. The belt-like water-containing gel (a) has a thickness of preferably from 1 to 100 mm, and more preferably from 3 to 50 mm, or from 4 to 20 mm. The thickness outside this range may provide reduced property or difficulty in particle size control, in some cases. The belt-like water-containing gel (a) has a width of preferably from 0.1 to 10 m, and more preferably from 0.5 to 5 m.

Solid content of the water-containing gel (a) subjected to the grain refining is from 20 to 80% by weight, preferably from 30 to 70% by weight, further preferably from 40 to 75% by weight, and still further preferably from 45 to 65% by weight. In the case where the water-containing gel with a solid content within the above range is obtained after polymerization (if necessary, by the addition of water or by drying), crushing is possible by a method for grain refining (crushing) of the present invention. In particular, in the present invention, particles with a solid content of not less than 40% by weight, preferably not less than 45% by weight, more preferably not less than 50% by weight at the time of grain refining, are suitable in applications, and enable particle size control. In the present invention, "solid content" means rate of solid content (% by weight) in water-containing gel, and as "solid content", value determined by a method described in Examples, to be described later, is adopted.

In the present invention, such a method is preferably used that an unsaturated monomer such as acrylic acid or the like, a polymerization initiator and an aqueous alkaline solution for neutralization of the unsaturated monomer are continuously mixed and stirred to prepare a monomer solution, followed by polymerization in a short time by continuously supplying this onto a belt, by utilization of neutralization heat and polymerization heat, to continuously obtain the belt-like water-containing gel (a). Preferable temperature of a monomer aqueous solution or polymerization temperature is in the above-described range (the above high temperature initiation polymerization).

Preferably temperature of the water-containing gel (a) at the time of gel grain refining is, in view of particle size control or property aspect, usually equal to or higher than 40° C., preferably from 40 to 120° C., more preferably from 50 to 100° C., and particularly preferably from 60 to 90° C. To maintain at such temperature, temperature of polymerization may be controlled, or polymer gel after polymerization may be subjected to heat insulation or heating, if necessary. In the case where the water-containing gel (a) at the time of gel grain refining has temperature higher than the above range, it may be subjected to heat radiation or cooling, while in the case where the water-containing gel (a) has temperature lower than 40° C., the water-containing gel (a) is preferably subjected to heating to equal to or higher than 40° C. A method for heating the above water-containing gel (a) (or water-containing gel (b) to be described later) is not especially limited, and various heating apparatuses may be used.

It is preferable a grain refining step that the water-containing gel (a) and the water-containing gel (b) coexist is carried out within preferably one hour, more preferably ten minutes, further preferably one minute after the water-containing gel (a) is taken from the apparatus used for polymerization, because the above mentioned preferable temperature range in gel grain refining is maintained.

(The Rough Crushing Step)

It should be noted that the rough crushing step, wherein particles are crushed roughly (rough crushing), may be carried out before the above grain refining step. This rough crushing of the water-containing gel (a) makes easy not only supply of the water-containing gel (a), but also filling into a grain refining apparatus to be described later, and enables to more smoothly carry out the grain refining step. As a rough crushing method used in the above rough crushing step, one, which is capable of rough crushing without kneading the water-containing gel, is preferable, and includes, for example, a guillotine cutter or the like.

A size or shape of a rough crushed product of the water-containing gel obtained in the rough crushing step differs by a method for polymerization used, therefore not especially limited, as long as being the size or shape in a degree enabling filling into the grain refining apparatus, however, in general, the size or shape of a rough crushed product of the water-containing gel (a) has a length of a longer side part thereof of preferably from 5 to 500 mm, more preferably from 10 to 150 mm, and further preferably from 30 to 100 mm. The length of the above side below 5 mm does not have meaning for crushing by the grain refining apparatus, while the length of the above side over 500 mm easily generates large clearance in filling the water-containing gel into the grain refining apparatus, and could reduce crushing efficiency.

(The Water-Swellable, Water-Containing Gel-Like Cross-Linked Polymer (b))

Explanation will be given below on the water-swellable, water-containing gel-like cross-linked polymer (b). It should be noted that the water-containing gel is one containing water and in a swollen state, however, embodiments containing a solvent other than water (hydrophilic solvent, for example alcohols such as methyl alcohol, ethyl alcohol, n-propyl alcohol, isopropyl alcohol, n-butyl alcohol, isobutyl alcohol, t-butyl alcohol, and the like) may be possible. In this case, the solvent other than water is preferably from 0 to 50% by weight, relative to water.

In the present invention, such a method is suitably used that after the addition of the water-containing gel (b) to the water-containing gel (a) before grain refining, the water-containing gel (a) and the water-containing gel (b) are continuously extruded by a grain refining apparatus (preferably a screw extruder) in a state that compression force at the vicinity of extrusion exit of the above screw extruder is enhanced. In this way, the treated amount is enhanced, the particle size of a water absorbent resin is also more controlled and preferably, fundamental properties (For example, after-mentioned absorption capacity, extractables and the like) are also improved as compared with the case where only the water-containing gel (a) is used.

Conventionally, in crushing, to prevent generation of kneading or mutual adhesion of crushed substances, an adhesion prevention agent such as silicone oil or the like, or sticking prevention agent such as a surfactant was added to a water-containing gel-like polymer. However, such a surfactant reduces absorption performance, due to reducing surface tension of the water-containing gel-like polymer, and silicone oil or the like reduces water absorbing characteristics due to lipophilic nature thereof, resulting in a cause of reducing quality of a water absorbent resin. According to the present invention, a water absorbent resin excellent in safety, without influence of the additives, even when used in a disposable diaper or a sanitary article, can be produced, by using a conventional simple apparatus and by using the water-containing gel (b) as an additive, and by carrying out efficient crushing, wherein kneading or mutual adhesion of crushed substances is prevented.

Crushing of water-containing gel using a screw extruder has been known, however, various adhesion prevention agents or sticking prevention agents have been added to prevent kneading or mutual adhesion during the crushing. However, supplying the water-containing gel (b), in crushing a water-containing polymer using a screw extruder, is capable of preventing kneading or mutual adhesion. Therefore, in the present invention, it is not necessarily required to add a surfactant, or an adhesion prevention agent such as silicone oil, and in view of property improvement of a water absorbent resin, adding amount of the surfactant and the adhesion prevention agent is preferably from 0 to 5% by weight, more preferably equal to or lower than 3% by weight, and further preferably equal to or lower than 1% by weight, relative to 100% by weight of the water-containing gel (a).

In the present invention, solid content or centrifuge retention capacity between the water-containing gel (a) and the water-containing gel (b) is different. The difference in solid content between the water-containing gel (a) and the water-containing gel (b) is preferably from 1 to 60, preferably from 2 to 55, more preferably from 2 to 50 in terms of improvement of property. "Difference in solid content" means absolute value of value that solid content of the water-containing gel (a) minus solid content of the water-containing gel (b). For example, in Example 1, difference in solid content is "3", because solid content of the water-containing gel (a) is 53.0% by weight, and solid content of the water-containing gel (b) is 50.0% by weight.

One preferable embodiment of the water-containing gel (b) is the water-containing gel (b2) having low solid concentration. In such an embodiment, the solid concentration is preferably equal to or lower than 10% by weight, more preferably equal to or lower than 5% by weight, and further preferably equal to or lower than 2% by weight. A certain degree of low solid concentration of the water-containing gel (b), namely to be low viscosity, fulfills roles of a lubricant by the water-containing gel (b), and suppresses mutual adhesion of the water-containing gel (a), or generation of kneading caused by sticking. In view of adhesion prevention or sticking adhesion, solid content of the water-containing gel (b) is preferably lower as compared with the water-containing gel (a). In addition, the lower limit of the solid content of the water-containing gel (b) is not especially limited, however, in view of reduction of fine particles, it is preferably not less than 0.1% by weight, more preferably not less than 0.3% by weight, and further preferably not less than 0.5% by weight. The water-containing gel (b2) having the same composition as that of the water-containing gel (a), but lower sold concentration is suitably used, and specifically, it can be obtained by the addition of water to the water-containing gel (a) obtained by the cross-linking polymerization step. Such an embodiment is very efficient in view of production, and also preferable in view of property due to having the same component. It should be noted that, different from the water-containing gel (b1) to be described later, effect of the water-containing gel (b2) does not depend on particle diameter of a cross-linked polymer before containing water; for example, even in water-containing gel of a cross-linked polymer composed of fine particles equal to or smaller than 150 μm, or water-containing gel of the water-containing gel (a) obtained by the cross-linking polymerization step, effect of the present invention is similar, as long as solid content is within the above range.

In addition, a further other preferable embodiment of the water-containing gel (b) is the water-containing gel (b1) obtained by the addition of water to a water absorbent resin fine powder. Here, "a fine powder" indicates that not less than 90% by weight of a powder has a particle diameter of preferably less than 212 μm, more preferably less than 180 μm, and further preferably less than 150 μm. One having a particle diameter less than 150 (180, 212) μm indicates one passing through a JIS standard sieve of 150 (180, 212) μm. The water-containing gel (b1), similarly to the water-containing gel (b2), not only fulfills role of a lubricant, but also reduces the fine powder of a water absorbent resin produced from the water-containing gel (a), and also improves uniformity of a water-containing gel mixture by being mixed in a grain refining apparatus.

Solid content in the water-containing gel (b1) is preferably from 10 to 70% by weight, more preferably from 20 to 60% by weight and further preferably from 30 to 60% by weight. It should be noted that effect of the present invention can be fulfilled even when solid of content the water-containing gel (b1) is a little higher, as compared with the above-described water-containing gel (b2); this is because, in the case of the fine particle, gel viscosity is low even when solid content thereof is high in a certain degree, and is capable of fulfilling a role of a lubricant among the water-containing gel (a) itself.

Namely, the water-containing gels (b2) and (b1) form a group as water-containing gel having low viscosity, and such water-containing gel having low viscosity acts as a lubricant suppresses mutual adhesion or sticking in crushing of the water-containing gel (a) and fulfills effect of the present invention.

In addition, a difference in centrifuge retention capacity between the water-containing gel (a) and the water-containing gel (b) is preferably 1 to 20 g/g, more preferably 2 to 15 g/g. It should be noted that absorption capacity (centrifuge retention capacity, CRC, per solid content) of the water-containing gel (a) is preferably from about 10 to 40 g/g. In the present invention, as centrifuge retention capacity (CRC) of water-containing gel, value determined by a method described in Examples to be described later is adopted, for a cross-linked polymer (solid content) in water-containing gel.

Centrifuge retention capacity of the water-containing gel (b) is preferably lower as compared with the water-containing gel (a); preferably lower by from 1 to 20 g/g, and further preferably lower by from about 2 to 15 g/g, as difference in centrifuge retention capacity (CRC).

The water-containing gel (b) is preferably produced from a water absorbent resin, which should be disposed in the production step of a water absorbent resin. Not only by being capable of recycling a substance to be originally disposed, but also by using a water absorbent resin, to be disposed, in the grain refining step, effect of reducing fine particles of a water absorbent resin is provided. Specifically, the following (b1) or (b2) is used.

(b1) Water-Containing Gel Obtained by the Addition of Water to a Water Absorbent Resin Powder As an example, the water-containing gel (b), which is obtained by the addition of water to a water absorbent resin powder after the classification step, is preferable. In the classification step subsequent to the drying step and the crushing step, only particles within the predetermined range are selected to make a water absorbent resin. A classification method here is also not especially limited, and a sieve or the like is suitably used. For example, in the case where the size of a crushed product is set to be in a range of from 212 to 850 μm, the crushed product is classified first, in advance, with a sieve of 850 μm, and then sieved the crushed product, which passed through the above sieve, with a sieve of 212 μm. A crushed product remaining on this sieve of 212 μm is a water absorbent resin within a desired range.

A water absorbent resin particle used in the water-containing gel (b) includes, as described above, a fine powder classified in the production step of a water absorbent resin, for example, the above classification step; a fine powder generating in the surface cross-linking step to be described later or the transportation step of a water absorbent resin; a fine powder captured in a bag filter in the crushing step; or the like, however, preferably a fine powder obtained by classification before or after the surface cross-linking step. In addition, a fine powder of a water absorbent resin, generating at the other production line or in a plant, may be used. The fine powder may be in a dried state or in a wet state, however, water content of the fine powder is preferably from 0 to 15% by weight, more preferably from 0 to 10% by weight, and particularly preferably from 0 to 5% by weight.

A fine powder with a particle diameter of less than 150 μm (or less than 212 μm; specified by a standard sieve), when used as a water absorbent resin, reduces property or handling property thereof. Specifically, it easily generates dust during work, deteriorates work environment, causes clogging, and in water absorption, easily generates an agglomerate (lump) and results in to inhibit diffusion of fluid. On the other hand, disposal of this fine powder as it not only requires cost or additional work for disposal, but also reduces yield in a water absorbent resin. Therefore, as a water absorbent resin powder used in the water-containing gel (b), it is very preferable that a fine powder preferably having a particle diameter of smaller than 212 μm, more preferably a particle diameter of smaller than 180 μm, and further preferably a particle diameter of smaller than 150 μm, is recovered for reuse. A particle diameter of smaller than 150 (180, 212) μm indicates one passing through a JIS standard sieve of 150 (180, 212) μm.

Solid content in the water-containing gel (b1), obtained by the addition of water to a water absorbent resin powder, is preferably from 10 to 70% by weight, more preferably from 20 to 60% by weight, and further preferably from 30 to 60% by weight.

(b2) Water-Containing Gel Obtained by the Addition of Water to Polymer Gel of a Water Absorbent Resin The above water-containing gel (b) is preferably obtained in the washing step with water of a production apparatus of a water absorbent resin. The washing step with water indicates the step for cleaning a production apparatus of the water absorbent resin after completion of production of the water absorbent resin. A production apparatus such as a polymerization apparatus or a gel crusher adhered with gel is continuously or in batch-wise washed with water, and the resulting gel or a dispersed substance in water may be used as it is as the water-containing gel (b). Namely, the water-containing gel (b2) is preferably water-containing gel having reduced solid content by the addition of water to polymer gel obtained in the cross-linking polymerization step. As a preferable embodiment, water-swollen gel obtained by continuously washing a belt with water, after peeling a belt-like gel in continuous belt polymerization, may be used as the water-containing gel (b).

The water-containing gel (b2) obtained in the above washing step with water is usually in a saturated-swollen state, therefore, solid content thereof is from 0.1 to 10% by weight, further from 0.3 to 5% by weight, and particularly from about 0.5 to 2% by weight, and is obtained with different solid content as compared with the water-containing gel-like cross-linked polymer (a) within a suitable range of the present invention. Use of the water-containing gel (b) having such low solid content is capable of providing uniform crushing of the water-containing gel (a) obtained in polymerization, and attaining particle size control or improvement of property of a water absorbent resin after drying. In addition, use of the water-containing gel (b2) is capable of suppressing adhesion of gel inside a grain refining apparatus onto the apparatus, and thus improving self-cleaning capability.

The water-containing gel (b), likewise the water-containing gel (a), is one wherein an unsaturated monomer is subjected to cross-linking polymerization. As the unsaturated monomer used for the water-containing gel (b), the same one as described in the above the water-containing gel (a) is used. It is preferable that composition of the unsaturated monomer is the same as in the water-containing gel (a) (preferably polyacrylic acid (salts)-based cross-linked polymer), in view of property of the resulting water absorbent resin.

(Using Amount)

The water-containing gel (b) is supplied to a grain refining apparatus together with the water-containing gel (a), however, supplying amount thereof is not especially limited, and differs depending on the embodiments of the water-containing gel (b). For example, in the case of the water-containing gel (b2) having low solid concentration, preferably the water-containing gel (a): the water-containing gel (b)=100: from 0.001 to 100, more preferably 100: from 0.001 to 50, in weight ratio. In addition, in the case of the fine powder of water-containing gel (b1), the ratio is preferably 100: from 0.1 to 50, and more preferably 100: from 0.1 to 30. To be within such a range is capable of sufficiently fulfilling effect of the addition of the water-containing gel (b), and being less possible to generate kneading during crushing. In addition, it also does not require excess quantity of thermal energy or drying time in drying the crushed substance, and also provides less reduction of property of a water absorbent resin.

Solid content of a mixture of the water-containing gel (a) and the water-containing gel (b) is preferably from 30 to 70% by weight, more preferably from 40 to 60% by weight, further preferably from 45 to 55% by weight. Temperature after mixing or after grain refining is also preferably within a range for the above water-containing gel (a).

(A Grain Refining Apparatus)

As a grain refining apparatus (a gel crusher) to be used, such one is preferably used that is classified to a shear rough crusher, an impact crusher, a high speed rotation type crusher, among crushers names classified in Table 1.10 of Powder Engineering Handbook (edited by Powder Engineering Association, $1^{st}$ edition), and has one or more mechanisms in crushing mechanism such as cutting, shearing, impacting, friction or the like; among crushers corresponding to such machine types, a crusher having cutting and shear mechanism as main mechanism is particularly preferably used.

As a crusher type name, a crusher is classified into a roll rolling type, and a roll mill (roll rotation type), and as for one having a compression mechanism as a crushing mechanism, those having strong shear and cutting effect can be used, however, those having weak shear and cutting effect but strong compression effect may not be used in certain cases.

In addition, a crusher type such as a compression crusher, a powder layer hammering type or the like is not used, because a compression mechanism is a main crushing mechanism, by which a water-containing polymer is hardly fractured by compression. In addition, a crusher type such as an autogenous mill or a ball medium mill is also not used, because of not substantially having a shear or cutting mechanism.

A specific example of a crusher or a cutting-shearing mill, which can be used in the present invention, is listed below.
VERTICAL CUTTING MILL, manufactured by Orient, Inc.
ROTOPLEX, manufactured by Hosokawa Micron Corp.,
TURBO CUTTER, manufactured by Turbo Kogyo Co., Ltd.
TURBO GRINDER, manufactured by Turbo Kogyo Co., Ltd.
TYRE SHREDDER, manufactured by Masuno Seisakusyo, Ltd.
ROTARY CUTTER MILL, manufactured by Yoshida Seisakusyo Co., Ltd.
CUTTER MILL, manufactured by Tokyo Atomizer manufacturing Co., Ltd.
DISC MILL, manufactured by PALLMANN Maschinenfabrik GmbH & Co.)
SHRED CRUSHER, manufactured by Tokyo Atomizer manufacturing Co., Ltd.
CUTTER MILL, manufactured by Masuko Sangyo Co., Ltd.
CRUSHER, manufactured by Masuko Sangyo Co., Ltd.
ROTARY CUTTER MILL, manufactured by Nara Machinery Co., Ltd.
GAINAX CRUSHER, manufactured by Hourai Corp.
U-COM, manufactured by Hourai Corp.
MESHMILL, manufactured by Hourai Corp.
DISC CUTTER, manufactured by Hourai Corp.

Among these grain refining apparatuses, a continuous or a batch-type kneader, shredder, meat chopper, "Dome Gran" or the like can be exemplified. For example, meat chopper is one for grain refining (crushing) by extruding water-containing gel from a porous plate, and as an extrusion mechanism, a system for pressure feeding water-containing gel from a supply port thereof to the porous plate, such as a screw type one or a rotating roll type one or the like is used. A screw type extruder may have a single-axis or a multi-axis, and may be one usually used for extrusion molding of meat, rubber, or plastics; or one used as a crusher.

A grain refining apparatus preferably used in the present invention is a screw extruder, which is available in low price, compact and simple in operation. Supplying a water-containing polymer using a screw extruder provides continuous entanglement of a belt-like substance onto a rotating blade, and thus the substance is transferred to the porous plate side while being crushed.

A grain refining apparatus preferably used in the present invention is a screw extruder having function of transferring a substance in an axis direction by a screw rotation in a static barrel. In the present invention, as a screw extruder, any screw number of a single screw, twin screw, or four screw or the like may be used, as long as being an apparatus having a porous plate and a rotating blade for grain refining water-containing gel to an optimal size, and screw(s) for transferring water-containing gel to the above porous plate, which are built-in a casing having a supply port of water-containing gel as a target of grain refining, and an extrusion port of a crushed substance. In addition, rotation direction of the twin screw may be any of co-rotational or counter-rotational direction. What is called a meat chopper or a screw extruder or the like is included.

In the porous plate or porous plane (for example, sphere-like one) to extrude the water-containing gel (a), pore diameter thereof preferably has a porous pore structure of from 0.3 to 25 mm. A pore shape is not especially limited, and includes circular form; four-way type such as square and rectangle; triangle, hexagon or the like, however, a circular hole is preferable for extrusion. It should be noted that, the above pore diameter is specified by diameter wherein the outer circumference of the mesh opening part is converted to the outer circumference of a circle. The pore diameter is preferably from 2 to 20 mm and further preferably from 5 to 15 mm. The pore diameter of the porous structure smaller than 0.3 mm may bring about string-like gel, or makes gel extrusion impossible. The pore diameter of the porous structure larger than 25 mm could not fulfill effect of the present invention. It should be noted that number of holes of the porous plate is determined as appropriate depending on size of the porous plate or the porous plane, and the hole may be one per porous plate, however, usually equal to or more than two, further from 3 to 10,000 and more preferably from 5 to 5,000. The number of porous plate per apparatus may be one, or plural number.

In addition, thickness of the above pore plate 17 (FIG. 1) is within a range of from 1 to 20 mm. Opening rate of the above pore plate is preferably from 20 to 55%, more preferably from 25 to 35%, and particularly preferably from 27 to 33%. The opening rate below 20% makes extrusion of water-containing gel difficult, and thus reduces productivity. In addition difficulty in extruding water-containing gel provides excessive grain refining of water-containing gel at a pressure feed region to the porous plate, and thus not preferable. On the other hand, the opening rate over 55% results in insufficient addition of compression force to water-containing gel and could provide insufficient dispersion of water-containing gel. It should be noted that the above opening rate indicates ratio of total area of all pores to total area of the porous plate (substantially, regarded as the same as cross-sectional area of the casing). An apparatus having the above porous plate, pore diameter and opening rate thereof set as described above is capable of adding large compression force to water-containing gel charged into a screw extruder, at the vicinity of the extrusion port.

It should be noted that, in the present invention, to improve mixing capability of fine powders or particle size control of grain refined water-containing gel, screw extruders may be combined in a multi-step way, or the same extruder may be used for multiple extrusions.

(A Screw Extruder)

As a grain refining apparatus preferably used in the present invention, a screw extruder is included, and explanation will be given below further thereon.

As a screw extruder, one equipped with the following configuration, for example, as shown in FIG. 1, is suitably used: the casing 11, the mounting 12, the screw 13, the supply port 14, the hopper 15, the extrusion port 16, the porous plate 17, the rotating blade 18, the ring 19, the back-flow prevention member 20, the motor 21, the belt-like protrusion 22 or the like.

The above casing 11 takes a cylinder-like shape, arranged with the screw 13 along a longitudinal direction of the casing 11 inside thereof. At the one end of the cylinder-like casing 11, the extrusion port 16 is installed to crush water-containing gel by extrusion, and at the other end, the motor 21 or a drive system for rotating the screw 13 is installed. At the lower part of the casing 11, the mounting 12 is installed, by which a screw type extruder can be arranged stably at the floor. On the other hand, at the upper part of the casing 11, the supply port 14 for supplying water-containing gel is installed, and preferably, the hopper 15 is installed to easily supply water-containing gel.

A shape or size of the above casing 11 is not especially limited, as long as having a cylinder-like inner surface so as to correspond to a shape of the screw 13. In addition, rotation number of the screw 13 is not especially limited because it differs as appropriate depending on the shape of a screw extruder, however, as will be described later, it is preferable that rotation number of the screw 13 is changed according to supplying amount of water-containing gel. The rotation number is, for example, from 1 to 1000 rpm, further from 10 to 500 rpm.

Rotation direction of the above screw 13 is not especially limited. In the present invention, the above screw 13 is set to rotate clockwise viewed from the end part of a side connecting the motor 21.

At the above extrusion port 16, the porous plate 17, having a plurality of the holes 17a, is arranged. In addition, this porous plate 17 is fixed to the extrusion port 16 in a detachable manner by the ring 19. It is because diameter of the holes 17a of the porous plate 17 determines particle size of grain refined water-containing gel, and therefore the porous plate 17 with different diameter of the holes 17a must be exchanged to adjust particle size of water-containing gel.

One embodiment of the present invention will be shown below. As shown in FIG. 1, water-containing gel (a) and water-containing gel (b) charged from the supply port 14 into the casing 11 are not mixed sufficiently. Water-containing gel (a) and water-containing gel (b) charged into the casing 11 are mixed (kneaded) by rotation of the screw 13, however, rotation of this screw 13 transfers rather than mixing them toward the extrusion port 16 side, resulting in adding external force to water-containing gel (a). Therefore, uniform compression force is added in a degree so that water-containing gel (a) is not compressed. It should be noted that most parts inside the casing 11, wherein such uniform compression force is added to water-containing gel (a), is set as a uniform compression zone, as shown in FIG. 1.

On the other hand, at the extrusion port 16, the porous plate 17 is arranged, and therefore water-containing gel (a) is not extruded so easily at the vicinity of the extrusion port 16, and is compressed by rotation of the screw 13. Furthermore, as described-above, water-containing gel (a) and water-containing gel (b) in the casing 11 are transported toward the extrusion port 16 side by rotation of the screw 13, which further increases compression force. As a result, water-containing gel (a) and water-containing gel (b) are stirred and mixed while being compressed (see FIG. 1) and extruded from the extrusion port 16 (the porous plate 17). It should be noted that the vicinity of the extrusion port 16, wherein such large compression force is added, is set as a compression zone, as shown in FIG. 1.

In usual stirring and mixing, water-containing gel (a) and water-containing gel (b) are not compressed (see the uniform compression zone in FIG. 1), therefore water-containing gel (b) added to water-containing gel (a) is not sufficiently dispersed, and easily becomes an agglomerate (lump). On the other hand, stirring and mixing by the above screw type extruder, water-containing gel (a) and water-containing gel (b) are mixed under compression, therefore water-containing gel (b) is stirred in a state of closely adhered to water-containing gel (a) (See the Compression Zone in FIG. 1).

Furthermore, the above-described screw extruder used in the present invention is preferably equipped with the back-flow prevention member 20 at least at the vicinity of the extrusion port 16. Therefore, the addition of further more sufficient compression force is possible to be added at the vicinity of the extrusion port 16. Equipment of the above back-flow prevention member 20 at the vicinity of the extrusion port 16 (the porous plate 17) prevents back-flow of water-containing gel (a) toward the supply port 14, even when diameter of the hole 17a is rather small. Therefore, the addition of further more sufficient compression force to the water-containing gel at the vicinity of the extrusion port 16 not only ensures dispersion and mixing of water-containing gel (b) but also carries out smooth extrusion of water-containing gel (a), which is capable of avoiding reduction of productivity.

A shape of the back-flow prevention member 20 is not especially limited, as long as one preventing back-flow of water-containing gel (a) from the extrusion port 16 toward the supply port 14 side. For example, as the back-flow prevention member 20, a helical belt-like protrusion 20a as shown in FIG. 1, a concentric circular and belt-like protrusion 20b, or the belt-like protrusion 22 in parallel to a forward direction of the screw 13 (see FIG. 1), a protrusion with a particulate, spherical or horn-like shape, or the like is included.

Clearance of the back-flow prevention member 20 and the screw 13 is preferably within a range of from 0.1 to 5 mm. The clearance below 0.1 mm inhibits rotation of the screw 13 by the back-flow prevention member 20, and thus not preferable. On the other hand, the clearance over 5 mm is not capable of preventing back-flow of water-containing gel by the back-flow prevention member 20 and thus not preferable.

At the vicinity of extrusion port 16, the end part of the screw 13, at the side not connected to the motor 21, is present, however, between the above porous plate 17 and the end part of the above screw 13, the above rotating blade 18 is arranged, so as to rotate by substantially contacting with the surface of the porous plate 17. Use of this rotating blade 18 makes particles of water-containing gel, which are extruded from the porous plate 17, smaller and is capable of making more uniform particle size distribution.

Configuration of the rotating blade 18 is not especially limited, and for example, one having configuration of a cross type may be suitably used. In addition, rotation direction of this rotating blade 18 is also not especially limited, and for example, in the present invention, the rotating blade 18 is set to rotate in the same direction as that of the screw 13. Furthermore, rotation number of the rotating blade 18 is also not especially limited.

Variation width of rotation number of the above screw 13, responding to change of supplying amount of water-containing gel is also not limited to special width, and optimal variation width may be specified by conditions of grain refining, for example, a shape of a screw extruder to be used (volume of the casing 11 or a shape of the screw 13, diameter of the hole 17a of the porous plate 17 or the like) or property of water-containing gel or the like. Therefore, the above rotation number is preferably specified as appropriate corresponding to a screw type extruder or water-containing gel to be used.

(Grain Refining Conditions)

The present inventors have found that time for gel to pass through inside a grain refining apparatus is an important factor in setting grain refining conditions, in the case where the water-containing gel (a) and the water-containing gel (b) are coexistence inside the grain refining apparatus. Furthermore, the present inventors have also found that it is preferable for gel to rapidly pass inside the apparatus to reduce a fine particle of finally obtained water absorbent resin. Detailed mechanism therefor is not clear, however, for gel to rapidly pass inside the apparatus is considered to reduce a fine particle of a water absorbent resin because of reduction of kneaded water-containing gel (a).

Explanation will be given on a screw extruder, as a preferable embodiment, with reference to FIG. 1; time for gel to pass through inside a grain refining apparatus is defined as time for gel to pass through inside the casing 11 of FIG. 1. In the present invention, residence time of gel represented by the following formula is used as time for gel to pass through inside the casing: residence time of gel (sec)=(residence amount of gel (kg)/charging amount of gel (kg/h))×3600 (sec/h). It should be noted that as residence amount of gel and charging amount of gel, values used in Examples are adopted.

The residence time of gel is preferably over 0 and equal to or shorter than 30 seconds, more preferably equal to or shorter than 25 seconds, further preferably equal to or shorter than 20 seconds and particularly preferably equal to or shorter than 15 seconds, in view of reducing a fine particle.

(Additives Other than Water)

In addition, in the present invention, other additives may be added to water-containing gel or a water absorbent resin.

Namely, to furnish various functions, an oxidizing agent; a reducing agent such as a (bi) sulfite salt or the like; a chelating agent such as an aminocarboxylic acid; water-insoluble inorganic or organic powder such as silica or metallic soap or the like; a deodorant, an antimicrobial agent, polyamine, pulp, or thermoplastic fiber or the like may be added to a water absorbent resin, as additives, in an amount of from 0 to 3% by weight and preferably from 0 to 1% by weight.

It should be noted that the above-described additives are referred to in detail in WO2006/109844, and these descriptions are also applied correspondingly to the present invention. Among these additives, chelating agents exemplified in U.S. Pat. Nos. 6,599,989, 6,469,080 or the like are preferably contained in a water absorbent resin, in an amount of preferably from 0.001 to 3% by weight and more preferably from 001 to 2% by weight.

<<The Drying Step>>

Grain refined gel obtained by the grain refining step is then subjected to the drying step, the crushing step, and the classification step as described above to yield a particulate water absorbent resin having a size of the predetermined range. It should be noted that the fine powder obtained after the crushing step, and the classification step is preferably reused by a method described above again.

For drying, a usual dryer or a heating furnace may be used. For example, an air-flow band dryer, a stirring dryer, a rotating dryer, a disk dryer, a fluidized bed dryer, an air-flow dryer, an infrared ray dryer, a microwave drying, a hot air drying, an infrared drying, a drum dryer drying, a stirring drying method or the like may be adopted. In the present invention, to prevent generation of a fine powder caused by physical fracture or friction of a dried substance, a drying method by hot air or the like, without moving a drying object, such as an air-flow band dryer, is preferable.

Drying temperature or drying time differs by a drying system, however, usually from 100 to 250° C. for from 3 to 120 minutes are sufficient. A dried substance obtained in this way has a solid content of usually from 85 to 99% by weight, and preferably from 90 to 98% by weight (drying loss at 180° C. for 3 hours).

(The Pulverizing Step)

A water absorbent resin is crushed after the drying step (the pulverizing step). A method for pulverizing here is also not especially limited, and the above dried substance may be subjected to pulverizing by a vibration mill, a roll granulator, a knuckle type crusher, a roll mill, a high speed rotation type crusher, a cylinder-like mixer or the like.

In the present invention, to reduce generation of a fine powder of a water absorbent resin, content of the fine powder in a water absorbent resin is low, even before the classification step to be described below; in the present invention, content of particles having a size of less than 150 μm in a water absorbent resin before classification is preferably not more than 10% by weight, and more preferably not more than 8% by weight.

<<The Classification Step>>

The above dried substance may be used as it is as a water absorbent resin, because generating amount of a fine powder thereof is less as compared with conventional one, however, it may be used as a particulate water absorbent resin after classification so as to have the predetermined size. Such a classification may be carried out by using a vibration sieve apparatus, an air-flow classification apparatus or the like. A water absorbent resin obtained in this way may have various shapes such as sphere-like, scale-like, indeterminate crushed form-like, fibrous, granular, bar-like, nearly spherical, flat-like shape or the like.

After the above drying step of the above water-containing gel-like cross-linked polymer, particle size may be adjusted, if necessary, and preferably specific particle size, to improve property in surface cross-linking to be described later. The particle size can be adjusted as appropriate by polymerization (in particular, reversed phase suspension polymerization), crushing, classification, agglomeration, fine particle recovering or the like.

Mass median particle size (D50) of a water absorbent resin is adjusted to from 200 to 600 μm, preferably from 200 to 550 μm, more preferably 250 to 500 μm, more further preferably from 300 to 450 μm, and particularly preferably from 350 to 400 μm. In addition, particles with a mass median particle size of smaller than 150 μm is preferably as low as possible, and adjusted to usually from 0 to 5% by weight, more preferably 0 to 3% by weight, and particularly preferably 0 to 1% by weight. Furthermore, particles with a mass median particle size of larger than 850 μm is preferably as low as possible, and adjusted to usually from 0 to 5% by weight, more preferably 0 to 3% by weight, and particularly preferably 0 to 1% by weight. Logarithmic standard deviation (σζ) of the particle size distribution is preferably from 0.20 to 0.40, preferably from 0.27 to 0.37, and more preferably from 0.25 to 0.35.

<<The Surface Cross-Linking Step>>

A water absorbent resin obtained as above can be subjected to surface cross-linking, if necessary, to improve absorption capacity against pressure, so as to yield a surface cross-linked water absorbent resin. The surface cross-linking improves absorption capacity against pressure, fluid permeability, absorption rate of a water absorbent resin. For the surface cross-linking, known surface cross-linking agents and known methods for surface cross-linking used in surface cross-linking of a water absorbent resin may be used.

As the above surface cross-linking agents, similar one used as a cross-linking agent, used in polymerization of the above monomer components may be used; and these cross-linking agents may be used alone or two or more kinds in combination. Among these, ethylene glycol diglycidyl ether, ethylene glycol, propylene glycol, butanediol, ethylene carbonate, polyethylene imine, polyamide amine-epichlorohydrin or the like is preferable. Using amount of the surface cross-linking agent is preferably in a range of from 0.01% by weight to 10% by weight, and further preferably in a range of from 0.05% by weight to 5% by weight, relative to a water absorbent resin before surface cross-linking.

The surface cross-linking agent is usually used as an aqueous solution of the surface cross-linking agent. To dissolve the surface cross-linking agent, water is preferably used as a solvent, and using amount of water depends on kind or particle size or the like of a water absorbent resin, however, it is preferably over 0 and not more than 20 parts by weight and more preferably in a range of from 0.5 to 10 parts by weight, relative to 100 parts by weight of solid content of a water absorbent resin.

In addition, in the case where a water absorbent resin and a surface cross-linking agent are mixed, a water-soluble organic solvent (a hydrophilic organic solvent) may be used as a solvent if necessary. As the hydrophilic organic solvent, for example, lower alcohols such as methyl alcohol, ethyl alcohol, n-propyl alcohol, isopropyl alcohol, n-butyl alcohol, isobutyl alcohol, t-butyl alcohol, and the like; ketones such as acetone and the like; ethers such as dioxane, tetrahydrofuran, alkoxypolyethylene glycol and the like; amides such as N,N-dimethylforamide and the like; sulfoxides such as dimethyl sulfoxide and the like is included. Using amount of the hydrophilic organic solvent depends on kind or particle size or the like of a water absorbent resin, however, preferably from 0 to 20 parts by weight, more preferably from 0 to 10 parts by weight, further preferably from 0 to 5 parts by weight and particularly preferably from 0 to 1 part by weight, relative to 100 parts by weight of solid content of a water absorbent resin.

Using amount of a solution composed of the above water and the water-soluble organic solvent (in the case of combined use) is preferably not more than 50% by weight, further preferably within a range of from 0.5% by weight to 20% by weight and particularly preferably within a range of from 1% by weight to 10% by weight, relative to the water absorbent resin without surface cross-linking.

Mixing of the above solution of the surface cross-linking agent into a base polymer (a particulate water absorbent resin before surface cross-linking treatment) leads to swelling of a water absorbent resin by water in the solution of the surface cross-linking agent or the like. Here, the swollen water absorbent resin is dried by heating. Heating temperature here (drying temperature) is preferably from 80 to 220° C. In addition heating time (drying time) is preferably from 10 to 120 minutes.

It should be noted that these methods for surface cross-linking are also described in various European patents such as EP No. 0349240, EP No. 0605150, EP No. 0450923, EP No. 0812873, EP No. 0450924, EP No. 0668080 or the like; or various Japanese patents such as JP-A-7-242709, JP-A-7-224304 or the like; various U.S. patents such as U.S. Pat. Nos. 5,409,771, 5,597,873, 5,385,983, 5,610,220, 5,633,316, 5,674,633, 5,462,972or the like; and various international patents such as WO99/42494, WO99/43720, WO99/42496 or the like, and these methods for surface cross-linking are also applicable to the present invention.

It should be noted that during surface cross-linking or after surface cross-linking, the agglomeration step may be set.

(A Water Absorbent Resin)

A water absorbent resin of the present invention is controlled to have, by the above surface cross-linking as an example of attaining method, an absorption capacity against pressure (AAP) to 0.9% by weight of sodium chloride, under 4.8 kPa, of preferably not less than 15 (g/g), more preferably not less than 18 (g/g), and further preferably not less than 20 (g/g). The upper limit thereof is not especially limited, however, preferably not more than 35 (g/g) and more preferably not more than 30 (g/g), in view of other property balance.

A water absorbent resin of the present invention is controlled to have, by the above surface cross-linking as an example of attaining method, a fluid permeability against pressure (flow conductivity of an aqueous solution of 0.69% by weight of sodium chloride, SFC) of not less than 5 ($\times 10^{-7} \cdot cm^3 \cdot s \cdot g^{-1}$), more preferably not less than 10 ($\times 10^{-7} \cdot cm^3 \cdot s \cdot g^{-1}$), further preferably not less than 30 ($\times 10^{-7} \cdot cm^3 \cdot s \cdot g^{-1}$), still further preferably not less than 50 ($\times 10^{-7} \cdot cm^3 \cdot s \cdot g^{-1}$), particularly preferably not less than 70 ($\times 10^{-7} \cdot cm^3 \cdot s \cdot g^{-1}$), and most preferably not less than 100 ($\times 10^{-7} \cdot cm^3 \cdot s \cdot g^{-1}$). A measurement method for SFC may be pursuant to a test of saline flow conductivity (SFC) described in JP-A-9-509591.

A water absorbent resin of the present invention is controlled to have, by the above step as an example of attaining method, centrifuge retention capacity (CRC) to an aqueous solution of sodium chloride of 0.90% by weight is preferably not less than 10 g/g, more preferably not less than 20 g/g, further preferably not less than 25 g/g and particularly preferably not less than 30 g/g. CRC is preferably as high as possible, and the upper limit is not especially limited, however, preferably not more than 50 (g/g), more preferably not more than 45 (g/g), and further preferably not more than 40 (g/g), in view of other property balance.

As for a particle size of a water absorbent resin, ratio of particles with a particle size of smaller than 150 μm is significantly reduced, by subjecting to the grain refining step relevant to the present invention. Ratio of particles with a particle size of smaller than 150 μm is preferably not more than 10% by weight, further preferably not more than 5% by weight, more preferably not more than 2.5% by weight and most preferably not more than 1.5% by weight, relative to a water absorbent resin produced by a method of the present invention. It should be noted that ratio of particles with a particle size of smaller than 150 μm is calculated by a method in Examples to be described later.

<<Applications of a Water Absorbent Resin>>

A water absorbent resin obtained by a production method relevant to the present invention is applicable to various applications, due to excellent absorption performance; for example, hygienic materials (body fluid absorption article) such as a disposable diaper or a sanitary napkin, an incontinence pad, a wound protection material, a wound curing material or the like; civil engineering and construction materials such as construction material or water retention material for soil, water shielding material, packing material, gel water bag or the like; agriculture and gardening article; or the like.

EXAMPLES

The present invention will be described in more specifically below, based on Examples, however, the present invention should not be limited thereto. It should be noted that, for convenience hereafter, "weight parts" may be described simply as "parts", "litter" simply as "L", and "milliliter" simply as "mL". In addition, "% by weight" may be described as "wt. %". Further, a water absorbent resin was used (handled) under a condition of 25° C.±2° C. and a relative humidity of about 50%±5% RH. In addition, as a normal saline solution, an aqueous solution of 0.90% by weight of sodium chloride was used.

It should be noted that in the case where a commercial article such as a water absorbent resin in a disposable diaper is analyzed and when it is in a moisture absorbed state, it may be subjected to measurement after adjustment of water content to about 5% by drying under reduced pressure as appropriate.

(Centrifuge Retention Capacity (CRC))

Into a bag (85 mm×60 mm) made of non-woven fabric (trade name: "Heatron Paper", model GSP-22, manufactured by Nangoku Pulp Industry Co., Ltd.), 0.2 g of a water absorbent resin was uniformly charged and heat sealed. Then this bag was immersed into a large excess (usually about 500 mL) of the normal saline solution adjusted at from 20° C. to 25° C. After 30 minutes, the bag was pulled up and subjected to drainage using a centrifugal separator (Model H-122, a centrifugal separator, manufactured by KOKUSAN Co., Ltd.) at a centrifugal force of 250 G for 3 minutes, as described in "edana ABSORBENCY II 441.1-99" to measure bag weight, W1 (g). In addition, the same procedure is carried out without using a water absorbent resin to measure weight at this time, W2 (g). Then, using these weights, W1 and W2, absorption capacity (g/g) was calculated according to the following formula:

absorption capacity (g/g)=(W1 (g)−W2 (g))/(weight of the water absorbent resin(g))

<Absorption Capacity Against Pressure (AAP)>

Figure 3:
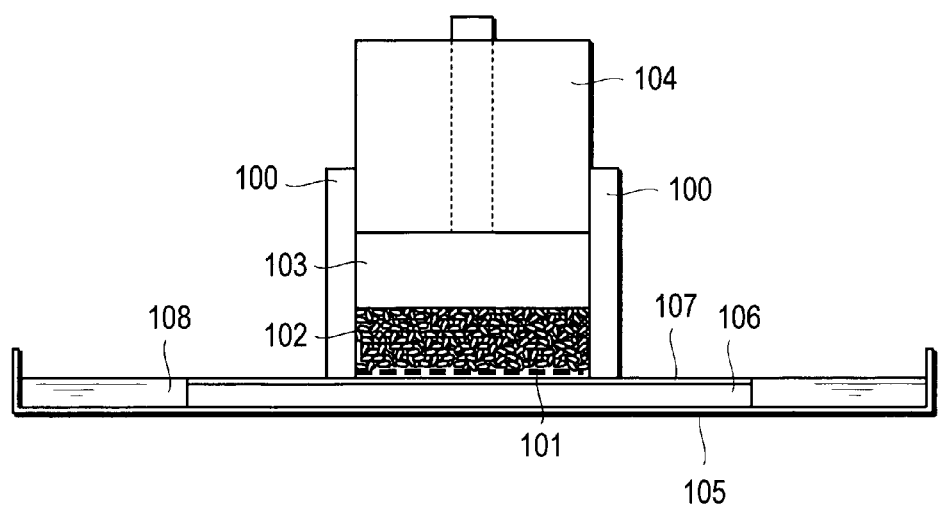
FIG. 3 is a schematic drawing of a measurement apparatus of absorption capacity against pressure (AAP), which is used in the Examples.

Using an apparatus shown in FIG. 3, the 400-mesh wire gauze of stainless steel 101 (a mesh size of 38 μm), was welded to the bottom of a plastic supporting cylinder 100 having an inner diameter of 60 mm, and 0.900 g of a water absorbent resin 102 was uniformly spread on the wire gauze; then a piston 103 and a load 104 each adjusted to exert a load of 4.83 kPa (0.7 psi) uniformly on the water absorbent resin, given an outside diameter slightly smaller than 60 mm, prevented from producing a gap relative to the supporting cylinder, and enabled to produce an unobstructed vertical motion were mounted thereon sequentially in the order mentioned, and the whole weight W6 (g) of the resultant measuring device was determined.

A glass filter 90 mm in diameter 106 (pore diameters: 100-120 μm: made by Sogo Rikagaku Glass Manufactory K.K.) was placed inside a petri dish 150 mm in diameter 105 and a physiological saline (20-25° C.) was added to the petri dish till it rose to the same level as the upper surface of the glass filter. One filter paper 90 mm in diameter 107 (0.26 mm in thickness and 5 μm in retained particle diameter; made by Advantec Toyo K.K. and sold under the product name of "JIS P3801, No. 2") was mounted on the physiological saline so as to have the surface thereof thoroughly wetted and the excess solution was removed.

The whole set of the above measurement apparatus was placed on the wetted filter paper, and the solution was subjected to absorption under load. After 1 hour, the whole set of the measurement apparatus was lifted up, to measure the weight thereof, W7 (g). Then, absorption capacity against pressure (g/g) was calculated from these weights, W6 and W7, according to the following formula:

Absorption capacity against pressure=(W7 (g)−W6 (g))/(weight of the water absorbent resin(g))

<Extractable Polymer Content>

Into a 250-mL plastic container equipped with a cap, 184.3 g of a normal saline solution is weighed, and 1.00 g of a water absorbent resin is added into the aqueous solution, and stirred for 16 hours to extract extractables in the resin. This extracted solution is subjected to filtering using a filter paper (trade name: JIS P3801, No. 2, manufactured by ADVANTEC TOYO MFS, Inc.; a thickness of 0.26 mm, and a retaining particle diameter of 5 μm), and 50.0 g of the resulting filtrate was weighed as a measurement solution.

Firstly, by using only a normal saline solution, titration was carried out using an aqueous solution of 0.1 N NaOH, till a pH of 10; subsequently by titration using an aqueous solution of 0.1 N HCl, till a pH of 2.7, blank titration amounts ([bNaOH] mL, [bHCl] mL) were obtained. By similar titration operation also on the measurement solution, titration amounts ([NaOH] mL, [HCl] mL) were obtained. For example, in the case where using a water absorbent resin composed of acrylic acid and a salt thereof with known amounts, is used, extractables of the water absorbent resin (extracted water-soluble polymer as the main component) can be calculated, based on average molecular weight of the monomer and the titration amounts obtained by the above operation, according to the following formula (2):

Extractables (% by weight)=0.1×(average molecular weight)×184.3×100×([HCl]−[bHCl])/1000/1.0/50.0　　(2)

In addition, in the case of unknown amounts, the average molecular weight of the monomer is calculated, using neutralization rate determined by the titration (the following formula (3))

Neutralization rate (% by mol)=(1−([NaOH]−[bNaOH])/([HCl]−[bHCl]))×100　　(3)

<Mass Median Particle Size, D50, and Logarithmic Standard Deviation (σζ)>

A water absorbent resin was sieved using JIS standard sieves with mesh size of 850 μm, 710 μm, 600 μm, 500 μm, 425 μm, 300 μm, 212 μm, 150 μm, 106 μm, 75 μm and 45 μm to make a logarithm plot of residual percent. It should be noted that, depending of particle diameter of a water absorbent resin, sieves were added as appropriate, if necessary. In this way, particle diameter corresponding to R=50% by mass was read as mass median particle size, D50. In addition, logarithmic standard deviation (σζ) is represented by the following formula, and smaller value of σζ means narrower particle size distribution.

σζ=0.5×ln(X2/X1)

(wherein, X1 and X2 are particle diameters when R=84.1% and R=84.1%, respectively)

Sieving was carried out by charging 10.0 g of a water absorbent resin in the above JIS standard sieves (The IIDA TESTING SIEVE, manufactured by IIDA Seisakusyo Co., Ltd.: an inner diameter of 80 mm) and subjected to classification for 5 minutes by a Ro-tap type sieve vibrator (an ES-65 model sieve vibrator, manufactured by Iida Seisakusho Co., Ltd.).

It should be noted that mass median particle size, D50, is a particle diameter of a standard sieve corresponding to 50% by mass of whole particles, using standard sieves with certain mesh openings, as described in U.S. Pat. No. 5,051,259 or the like.

<Ratio of Particles Having a Diameter of Smaller than 150 μm>

A water absorbent resin was sieved using a JIS standard sieve with a mesh opening of 150 μm, and ratio of particles, which passed through the JIS standard sieve with a mesh size of 150 μm, to the total amount of the water absorbent resin was calculated by the following formula:

Ratio of particles having a diameter of smaller than 150 μm (%)=(weight (g) of a water absorbent resin passed through a sieve with a mesh size of 150 μm/total weight (g) of water absorbent resins sieved)×100

<Residence Amount of Gel and Residence Time of Gel>

Supply of gel to a meat chopper and rotation of the meat chopper were stopped at the same time, and gel amount (kg) left in the meat chopper was weighed as residence amount of gel. In addition, residence time of gel in the meat chopper was calculated by weighing charging amount (kg/h) of gel into the meat chopper, according to the following formula:

Residence time of gel(sec)=(residence amount of gel(kg)/charging amount of gel(kg/h))×3600 (sec/h)

<Measurement of Residual Monomer>

Into 1000 g of deionized water, 0.5 g of a water absorbent resin was added and extracted for two hours under stirring with 4 cm stirrer, and subsequently, the swollen gel-like water absorbent resin was filtered off using a filter paper to analyze residual monomer amount in the filtrate, with liquid chromatography. On the other hand, a calibration curve obtained by similar analysis of monomer standard solutions with known concentrations was used as an external standard to determine residual monomer amount in a water absorbent resin, in consideration of dilution times of the filtrate.

<Solid Content>

In an aluminum cap with a diameter of the bottom surface of about 50 mm, 1.00 g of a water absorbent resin was weighed to measure total weight of the water absorbent resin and the aluminum cap, W8 (g). Then, they were dried by standing still in an oven at an atmosphere temperature of 180° C. for three hours. After three hours, the water absorbent resin and the aluminum cup taken out from the oven were sufficiently cooled to room temperature in a desiccator to measure total mass of the water absorbent resin and the aluminum cap, W9 (g), after drying; solid content was determined by the following formula:

Solid content(% by weight)=100−[(W8−W9)/(weight of a water absorbent resin particle(g))]×100

In addition, as for water-containing gel, solid content was determined similarly as in the above measurement method except that drying time was set to 16 hours.

Reference Example 1

Figure 2:
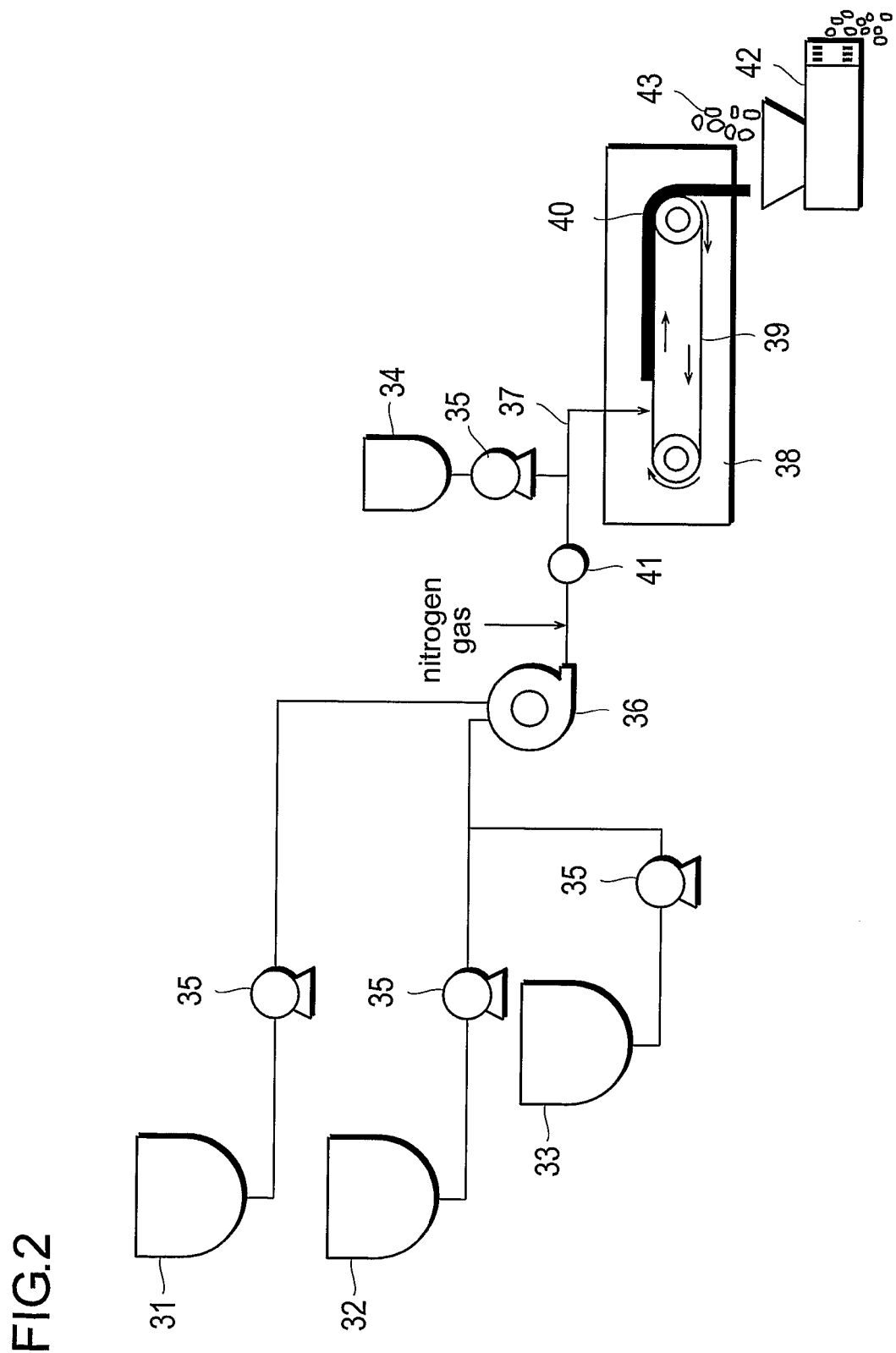
FIG. 2 is a schematic drawing of an arrangement structure of a continuous polymerization apparatus and gel crusher, which is capable of performing a production method of the present invention.

(A) an aqueous solution of 48.5 wt. % of sodium hydroxide, (B) an aqueous solution of 54.3 wt. % of acrylic acid, (C) a solution composed of 9.33 wt. % of polyethylene glycol diacrylate (an average molecular weight of 523), 0.30 wt. % of hydroxycyclohexyl phenyl ketone, 0.37 wt. % of an aqueous solution of 46 wt. % of diethylene triamine pentaacetic acid trisodium, 45.0 wt. % of acrylic acid and 45.0 wt. % of industrial pure water, and (D) an aqueous solution of 3.0 wt. % of sodium persulfate were each separately prepared, and each solution charged in a tank 31 storing the aqueous solution (A), a tank 32 storing the aqueous solution (B), a tank 33 storing the solution (C), and a tank 34 storing the aqueous solution (D) (see FIG. 2). Solution temperature in each of the tanks was set as follows: 33° C. for the aqueous solution (A), 11° C. for the aqueous solution (B), 24° C. for the solution (C), and 24° C. for the aqueous solution (D). It should be noted that a pump 35 is installed at the each tank in FIG. 2.

By using a continuous polymerization apparatus shown in FIG. 2, and by setting supplying amount (flowing amount) of each of the solutions as follows: 17.5 kg/h for the aqueous solution (A); 40.0 kg/h for the aqueous solution (B); 1.7 kg/h for the solution (C); and 0.8 kg/h for the aqueous solution (D), these solutions were mixed in the supply pipeline 37 to prepare an aqueous solution of a water-soluble unsaturated monomer (1). In this case, temperature of the aqueous solution of the unsaturated monomer was 102° C. In the above mixing, nitrogen gas was introduced in a flowing rate of 200 mL/min into the supply pipeline 37 at the more downstream side than the dispersion apparatus 36 in FIG. 2. Temperature of the aqueous solution of the water-soluble unsaturated monomer (1) in the supply pipeline 37 was stabilized at 97° C. Amount of dissolved oxygen (a) in the aqueous solution of the water-soluble unsaturated monomer (1) in the supply pipeline 37 was 8.6 mg/L. It should be noted that a degassing apparatus is installed on the supply pipeline 37 in FIG. 2.

The aqueous solution of the water-soluble unsaturated monomer (1) in the supply pipeline 37 was subsequently supplied to the belt polymerization apparatus 38, as a polymerization system, to carry out polymerization. The belt polymerization apparatus 38 is equipped with the endless belt 39 with a length of 3.8 m and a width of 60 cm, which is coated with a fluorocarbon resin at the surface thereof, installed with a UV lamp on the belt 39, heated at about 100° C. at the bottom surface side of the belt 39 and the surrounding of the belt polymerization apparatus 38, and maintained at a moisturized state, and provided with an air suction pipeline to recover evaporated water, at the center part. Amount of dissolved oxygen (b) in the aqueous solution of the water-soluble unsaturated monomer (1) after purging dissolved oxygen, in supplying to the polymerization step, was 3.5 mg/L. The aqueous solution of the water-soluble unsaturated monomer (1) was continuously supplied onto the above belt 39 from the supply pipeline to carry out polymerization, to obtain the belt-like polymer gel 40.

The resulting belt-like water-containing gel-like cross-linked polymer (a1) (with a thickness of 5-10 mm) 40 was continuously crushed into particulate form using the meat chopper 42 (model TB32, manufactured by Hiraga Kosakusyo Co., Ltd.). Rotation number of the meat chopper here was 105 rpm, charging amount of gel into meat chopper was 50.9 kg/h; and residence amount of gel in the meat chopper was 0.36 kg. Water-swellable, water-containing gel-like cross-linked polymer (b) 43, having a solid content or a centrifuge retention capacity different from that of the cross-linked polymer (a1) 40 can also be added into meat chopper 42.

The particulate water-containing gel-like cross-linked polymer (a1), obtained by crushing using the meat chopper, was spread on a wire gauze of stainless steel with a mesh size of 850 μm, to be subjected to drying by hot air at 180° C. for 30 minutes, and then a dried substance was pulverized using a roll mill to obtain a particulate water absorbent resin. Centrifuge retention capacity (CRC) of the particulate water absorbent resin was 34 g/g.

The resulting water absorbent resin was classified using a JIS standard sieve with a mesh size of 160 μm to obtain a polyacrylic acid (salts)-based water absorbent resin particle (A) having a D50 of 97 μm and a particle diameter of equal to or smaller than 160 µm. In addition, centrifuge retention capacity (CRC) of the water absorbent resin particle (A) was 32 g/g.

Example 1

In a KRC kneader (model S2, manufactured by Kurimoto, Ltd.), 2.7 kg/h of the water absorbent resin particle (A) obtained in Reference Example 1, and 2.7 kg/h of ion-exchanged water were mixed to obtain the water-containing gel-like cross-linked polymer (b1) with a solid content of 50% by weight, which was then continuously charged and crushed in the meat chopper, together with the water-containing gel-like cross-linked polymer (a1) (polymer gel having a solid content of 53% by weight) obtained similarly as in Reference Example 1. Total charging amount of gel (water-containing gel-like cross-linked polymers (a1) and (b1)) into the meat chopper here was 56.3 kg/h, and residence amount of gel in the meat chopper was 0.27 kg.

The water-containing gel-like cross-linked polymers (a1) and (b1) crushed using the meat chopper were spread on a wire gauze of stainless steel with a mesh size of 850 µm, to be subjected to drying by hot air at 180° C. for 30 minutes, and then a dried substance was pulverized using a roll mill to obtain a particulate water absorbent resin. Ratio of particles, having a particle diameter of smaller than 150 µm, of the resulting particulate water absorbent resin was 7.1% by weight.

By further classification and blending of the resulting water absorbent resin using JIS standard sieves with mesh size of 850 µm, 600 µm, 300 µm, 150 µm, and 45 µm, a water absorbent resin powder (1) was obtained, which had D50 of 461 µm; ratio of particles, having a particle diameter of equal to or larger than 850 µm, of 0% by weight; ratio of particles, having a particle diameter of equal to or larger than 600 µm and smaller than 850 µm, of 28% by weight; and ratio of particles, having a particle diameter of smaller than 150 µm, of 7.1% by weight; and a logarithmic standard deviation (σζ) of 0.364.

To 100 parts by weight of the resulting water absorbent resin powder (1), a solution of a surface treatment agent, composed of mixed solution containing 0.3 part by weight of 1,4-butanediol, 0.5 part by weight of propylene glycol, and 2.7 parts by weight of deionized water, was uniformly mixed. The water absorbent resin mixed with the solution of the surface treatment agent was subjected to heat treatment at arbitrary time, using a heating apparatus equipped with a stirring blade and a jacket (a jacket temperature of 210° C.). After the heat treatment, the resulting water absorbent resin was subjected to passing through the JIS standard sieve with a mesh size of 850 µm to obtain surface cross-linked particulate water absorbent resin (1). Various properties of the particulate water absorbent resin (1) were shown in Table 1.

Example 2

In a KRC kneader (model S2, manufactured by Kurimoto, Ltd.), 0.05 kg/h of the water absorbent resin particle (A) obtained in Reference Example 1, and 5.0 kg/h of ion-exchanged water were mixed to obtain the water-swollen gel (a water-containing gel-like cross-linked polymer (b2)) with a solid content of 1% by weight, which was then continuously charged and crushed in the meat chopper, together with the water-containing gel-like cross-linked polymer (a1) obtained similarly as in Reference Example 1. Total charging amount of gel ((a1)+(b2)) into the meat chopper here was 55.95 kg/h, and residence amount of gel in the meat chopper was 0.23 kg.

Gel obtained by crushing using the meat chopper was subjected to drying and pulverizing similarly as in Example 1 to obtain a particulate water absorbent resin. Ratio of particles, having a particle diameter of smaller than 150 µm, of the resulting particulate water absorbent resin was 7.8% by weight, and ratio of particles, having a particle diameter of not less than 850 µm was 0% by weight.

The resulting water absorbent resin was subjected to surface cross-linking treatment and sieving using a JIS standard sieve with a mesh size of 850 µm, similarly as in Example 1 to obtain particulate water absorbent resin (2). Various properties of the particulate water absorbent resin (2) were shown in Table 1.

Example 3

In a KRC kneader (model S2, manufactured by Kurimoto, Ltd.), 2.7 kg/h of the water absorbent resin particle (A) obtained in Reference Example 1, and 1.8 kg/h of ion-exchanged water were mixed to obtain a water-containing gel-like cross-linked polymer (b3) with a solid content of 60% by weight, which was then continuously charged and crushed in the meat chopper, together with the water-containing gel-like cross-linked polymer (a1) (polymer gel having a solid content of 53% by weight) obtained similarly as in Reference Example 1. Total charging amount of gel into the meat chopper here was 55.4 kg/h, and residence amount of gel in the meat chopper was 0.30 kg.

Gel obtained by crushing using the meat chopper was subjected to drying and pulverizing similarly as in Example 1 to obtain a particulate water absorbent resin. Ratio of particles, having a particle diameter of smaller than 150 µm, of the resulting particulate water absorbent resin was 8.9% by weight, and ratio of particles, having a particle diameter of not less than 850 µm was 0% by weight.

The resulting water absorbent resin was subjected to surface cross-linking treatment and sieving using a JIS standard sieve with a mesh size of 850 µm, similarly as in Example 1 to obtain particulate water absorbent resin (3). Various properties of the particulate water absorbent resin (3) were shown in Table 1.

Example 4

Water-containing gel-like cross-linked polymers (a2) (a solid concentration of 54.2% by weight) was obtained similarly as in Reference Example 1, except that composition of the solution (C) in Reference Example 1 was changed to 5.60 wt. % of polyethylene glycol diacrylate (an average molecular weight of 523), 0.30 wt. % of hydroxycyclohexyl phenyl ketone, 0.37 wt. % of an aqueous solution of 46 wt. % of diethylene triamine pentaacetic acid trisodium, 45.0 wt. % of acrylic acid and 48.73 wt. % of industrial pure water.

Similarly as in Example 1, in a KRC kneader (model S2, manufactured by Kurimoto, Ltd.), 2.7 kg/h of the water absorbent resin particle (A) obtained in Reference Example 1, and 2.7 kg/h of ion-exchanged water were mixed to obtain a water-containing gel-like cross-linked polymer (b1) (swollen gel), which was then continuously charged and crushed in the meat chopper, together with the water-containing gel-like cross-linked polymer (a2). Total charging amount of gel into the meat chopper here was 55.2 kg/h, and residence amount of gel in the meat chopper was 0.33 kg.

Gel obtained by crushing using the meat chopper was subjected to drying and pulverizing similarly as in Example 1 to obtain a particulate water absorbent resin. Ratio of particles, having a particle diameter of smaller than 150 μm, of the resulting particulate water absorbent resin was 6.6% by weight, and ratio of particles, having a particle diameter of not less than 850 μm was 0% by weight.

The resulting water absorbent resin was subjected to surface cross-linking treatment and sieving using a JIS standard sieve with a mesh size of 850 μm, similarly as in Example 1, to obtain particulate water absorbent resin (4).

Example 5

Water-containing gel-like cross-linked polymers (a3) (a solid concentration of 43.0% by weight) was obtained similarly as in Reference Example 1, except that the concentration of the aqueous solution (B) in Reference Example 1 was changed to 33% by weight.

Then, in a KRC kneader (model S2, manufactured by Kurimoto, Ltd.), 2.7 kg/h of the water absorbent resin particle (A) obtained in Reference Example 1, and 2.7 kg/h of ion-exchanged water were mixed to obtain a water-containing gel-like cross-linked polymer (b1), which was then continuously charged and crushed in the meat chopper, together with the water-containing gel-like cross-linked polymer (a3). Total charging amount of gel into the meat chopper here was 58.4 kg/h, and residence amount of gel in the meat chopper was 0.22 kg.

Gel obtained by crushing using the meat chopper was subjected to drying and pulverizing similarly as in Example 1 to obtain a particulate water absorbent resin. Ratio of particles, having a particle diameter of smaller than 150 μm, of the resulting particulate water absorbent resin was 6.3% by weight, and ratio of particles, having a particle diameter of not less than 850 μm was 0% by weight.

The resulting water absorbent resin was subjected to surface cross-linking treatment and sieving using a JIS standard sieve with a mesh size of 850 μm, similarly as in Example 1, to obtain particulate water absorbent resin (5).

Comparative Example 1

A crushed substance of polymer gel (water-containing gel-like cross-linked polymer (a1)) obtained by polymerization in Reference Example 1, and a water-swollen gel-like substance (water-containing gel-like cross-linked polymer (b1)) obtained by mixing in Example 1, using a KRC kneader (manufactured by Kurimoto, Ltd.) were weighed in the same predetermined amount, and were spread on a wire gauze of stainless steel with a mesh size of 850 μm, to be subjected to drying by hot air at 180° C. for 30 minutes.

Then a dried substance was pulverized using a roll mill to obtain a particulate water absorbent resin. Ratio of particles, having a particle diameter of smaller than 150 μm, of the resulting particulate water absorbent resin was 14.4% by weight, and ratio of particles, having a particle diameter of not less than 850 μm was 0% by weight.

The resulting water absorbent resin was subjected to surface cross-linking treatment and sieving using a JIS standard sieve with a mesh size of 850 μm, similarly as in Example 1, to obtain a comparative particulate water absorbent resin (1).

Comparative Example 2

A particulate water absorbent resin was obtained, without the addition of swollen gel (water-containing gel-like cross-linked polymer (b1)), similarly as in polymerization in Reference Example 1. By further classification and blending of the resulting particulate water absorbent resin using JIS standard sieves with mesh size of 850 μm, 600 μm, 300 μm, 150 μm, and 45 μm, a comparative water absorbent resin powder (2) was obtained.

The resulting comparative water absorbent resin powder (2) was subjected to surface cross-linking treatment and sieving using a JIS standard sieve with a mesh size of 850 μm, similarly as in Example 1, to obtain a comparative particulate water absorbent resin (2).

Comparative Example 3

Only polymer gel (water-containing gel-like cross-linked polymer (a3)) obtained by polymerization in Example 5, without the addition of swollen gel (water-containing gel-like cross-linked polymer (b1)), in Example 5, was crushed using a meat chopper. Then, similarly as in Example 5, the crushed substance spread on a wire gauze of stainless steel with a mesh size of 850 μm, to be subjected to drying by hot air at 180° C. for 30 minutes. Then a dried substance was pulverized using a roll mill to obtain a particulate water absorbent resin. Ratio of particles, having a particle diameter of smaller than 150 μm, of the resulting particulate water absorbent resin was 8.6% by weight, and ratio of particles, having a particle diameter of not less than 850 μm was 0% by weight.

The resulting water absorbent resin was subjected to surface cross-linking treatment and sieving using a JIS standard sieve with a mesh size of 850 μm, similarly as in Example 1, to obtain a comparative particulate water absorbent resin (3).

(Result)

Various properties of the above particulate water absorbent resins (1) to (5), and the comparative particulate water absorbent resins (1) to (3) were shown in Table 1.

TABLE 1

| | | Various conditions in gel crushing | | | | Particulate water absorbent resin |
| --- | --- | --- | --- | --- | --- | --- |
| | | Retention amount of gel (kg) | Retention time of gel (sec) | Solid content of water-containing gel (a) (% by weight) | Solid content of water-containing gel (b) (% by weight) | after crushing using roll mill Rate of particles having a particle diameter of smaller than 150 μm (%) |
| Reference Example 1 | | 0.36 | 25.5 | 53.0 | — | — |
| Example 1 | Particulate water absorbent resin (1) | 0.27 | 17.3 | 53.0 | 50.0 | 7.1 |
| Example 2 | Particulate water absorbent resin (2) | 0.23 | 14.8 | 53.0 | 0.99 | 7.8 |

TABLE 1-continued

| | | | | | | |
|---|---|---|---|---|---|---|
| Example 3 | Particulate water absorbent resin (3) | 0.30 | 19.5 | 53.0 | 60.0 | 8.9 |
| Example 4 | Particulate water absorbent resin (4) | 0.33 | 21.5 | 54.2 | 50.0 | 6.6 |
| Example 5 | Particulate water absorbent resin (5) | 0.22 | 13.6 | 43.0 | 50.0 | 6.3 |
| Comparative Example 1 | Comparative particulate water absorbent resin (1) | 0.36 | 25.5 | 53.0 | 50.0 | 14.4 |
| Comparative Example 2 | Comparative particulate water absorbent resin (2) | 0.36 | 25.5 | 53.0 | — | 11.3 |
| Comparative Example 3 | Comparative particulate water absorbent resin (3) | 0.28 | 19.0 | 43.0 | — | 8.0 |

| | | Particulate water absorbent resin after surface treatment | | | |
|---|---|---|---|---|---|
| | | Absorption capacity (g/g) | Absorption capacity against pressure (g/g) | Extractables (% by mass) | Rate of particles having a particle diameter of smaller than 150 μm (%) |
| Reference Example 1 | | — | — | — | — |
| Example 1 | Particulate water absorbent resin (1) | 27.3 | 24.1 | 13.3 | 1.3 |
| Example 2 | Particulate water absorbent resin (2) | 27.7 | 24.6 | 12.8 | 1.5 |
| Example 3 | Particulate water absorbent resin (3) | 27.3 | 23.4 | 13.9 | 1.0 |
| Example 4 | Particulate water absorbent resin (4) | 33.8 | 22.1 | 19.5 | 0.8 |
| Example 5 | Particulate water absorbent resin (5) | 27.5 | 25.5 | 11.9 | 1.0 |
| Comparative Example 1 | Comparative particulate water absorbent resin (1) | 26.6 | 22.1 | 12.4 | 2.6 |
| Comparative Example 2 | Comparative particulate water absorbent resin (2) | 27.0 | 23.0 | 13.7 | 1.5 |
| Comparative Example 3 | Comparative particulate water absorbent resin (3) | 27.5 | 25.6 | 11.0 | 1.2 |

(Supplemental Explanation on Table)

In Examples 1 to 3, wherein polymer gel (a water-containing gel-like cross-linked polymer (a3)) is subjected to grain refining in the presence of water-swollen gel (a water-containing gel-like cross-linked polymer (b1)), not only treatment amount is improved due to reduced residence time of gel by 24-42% (Reference Example 1, 25.5 seconds; Example 1-5, 14.8-21.5 seconds), but also a fine particle having a particle diameter of smaller than 150 μm after crushing by roll mill is reduced by 37-22%, and further absorption capacity or absorption capacity against pressure is also improved, and in particular, extractables are also reduced, in the case where solid content of water-swollen gel is low, as compared with Comparative Example 2, wherein a water-containing gel-like cross-linked polymer (a3) is subjected to grain refining without using water-swollen gel.

Similar effect is observed; namely, even in polymer gel having low solid content (a water-containing gel-like cross-linked polymer (a3)), as is found by comparison between Example 5 and Comparative Example 3, presence of water-swollen gel (a water-containing gel-like cross-linked polymer (b1)) not only enhances treatment amount due to reduced residence time of gel, but also reduces a fine particle having a particle diameter of smaller than 150 μm. It should be noted that, by comparison between Examples 1 to 3 and Example 5, effect of the present invention is found to be fulfilled in a region where solid content of water-containing gel-like cross-linked polymer (a) is high.

In Comparative Example 1, wherein water-swollen gel (a water-containing gel-like cross-linked polymer (b1)) is mixed after grain refining of polymer gel (a gel-like cross-linked polymer (a1)), in Example 1, absorption capacity or absorption capacity against pressure is also low, as compared with Example 1 or Comparative Example 2 (wherein a water-containing gel-like cross-linked polymer (b1) is not used).

INDUSTRIAL APPLICABILITY

A production method relevant to the present invention is capable of controlling a particle size (for example, reduction of a fine powder) or improving fundamental property (for example, absorption capacity, absorption capacity against pressure, extractables), without particularly using new sub-raw materials or additives, and in low price and in high productivity, and is thus preferable as a method for producing a water absorbent resin.

This application is based on Japanese patent application No. 2006-267567 filed in Japan on Sep. 29, 2006, and the disclosed contents thereof are incorporated herein by reference in its entirety.

The invention claimed is:

1. A method for producing a water absorbent resin particle, the method comprising:
    subjecting an aqueous solution of acrylic acid or a salt thereof to cross-linking polymerization to produce a water-swellable, water-containing cross-linked polymer (a) having a centrifuge retention capacity and a solid content;
    adding a water-swellable, water-containing crosslinked polymer (b) to the water-swellable, water-containing cross-linked polymer (a) to form a mixture;
    grain refining the mixture in a grain refining apparatus to produce a grain refined gel;
    drying the grain refined gel to yield a dried substance; and pulverizing the dried substance,
    wherein the water-swellable, water-containing cross-linked polymer (b) has a centrifuge retention capacity different from the centrifuge retention capacity of the cross-linked polymer (a); the solid content of the water-swellable, water-containing cross-linked polymer (a) is 40 - 80% by weight; the solid content of the water-swellable, water-containing cross-linked polymer (b) is 0.1 - 5% by weight; and a surface cross-linking step is performed by using a surface cross-linking agent after the drying step.

2. The method according to claim 1, wherein the grain refining apparatus is a screw extruder.

3. The method according to claim 1, wherein the solid content of a mixture of the water-swellable, water-containing cross-linked polymers (a) and (b) is from 40 to 60% by weight.

4. The method according to claim 1, wherein the water-swellable, water-containing cross-linked polymer (b) is obtained by recycling of the production of a water absorbent resin.

5. The method according to claim 1, wherein the water-swellable, water-containing cross-linked polymer (b) is obtained from a polymer gel in a cross-linking polymerization step.

6. The method according to claim 1, wherein the water-swellable, water-containing cross-linked polymer (b) is obtained by the addition of water to a water absorbent resin particle subjected to a classification step.

7. The method according to claim 1, wherein the water-swellable, water-containing cross-linked polymer (b) is obtained by washing a production apparatus of a water absorbent resin with water.

8. The method according to claim 1, wherein the surface cross-linking agent is selected from the group consisting of ethylene glycol diglycidyl ether, ethylene glycol, propylene glycol, butanediol, ethylene carbonate, polyethylene imine, polyamide amine-epichlorohydrin, and a combination thereof.

9. The method according to claim 1, wherein a solid content of a mixture of the water-swellable, water-containing cross-linked polymer (a) and the water-swellable, water-containing cross-linked polymer (b) is 45 - 55% by weight.

10. The method according to claim 1, wherein a difference in the centrifuge retention capacity between the water-swellable, water-containing cross-linked polymer (a) and the water-swellable, water-containing cross-linked polymer (b) is 1 to 20 g/g.

11. The method according to claim 1, wherein a residence time of a mixture of the water-swellable, water-containing cross-linked polymer (a) and the water-swellable, water-containing cross-linked polymer (b) inside the grain refining apparatus is not more than 25 seconds.

* * * * *